(12) United States Patent
Camosy

(10) Patent No.: US 9,493,196 B2
(45) Date of Patent: Nov. 15, 2016

(54) WAKE CONVERGENCE DEVICE FOR A VEHICLE

(71) Applicant: Auto Research Center, LLC, Indianapolis, IN (US)

(72) Inventor: Michael W. Camosy, Indianapolis, IN (US)

(73) Assignee: Auto Research Center, LLC, Indianapolis, IN (US)

( * ) Notice: Subject to any disclaimer, the term of this patent is extended or adjusted under 35 U.S.C. 154(b) by 0 days.

(21) Appl. No.: 14/407,674

(22) PCT Filed: Jun. 13, 2013

(86) PCT No.: PCT/US2013/045661
§ 371 (c)(1),
(2) Date: Dec. 12, 2014

(87) PCT Pub. No.: WO2013/188669
PCT Pub. Date: Dec. 19, 2013

(65) Prior Publication Data
US 2015/0166129 A1 Jun. 18, 2015

Related U.S. Application Data

(60) Provisional application No. 61/774,048, filed on Mar. 7, 2013, provisional application No. 61/658,959, filed on Jun. 13, 2012.

(51) Int. Cl.
*B60N 99/00* (2006.01)
*B62D 35/00* (2006.01)

(52) U.S. Cl.
CPC ................... *B62D 35/001* (2013.01)

(58) Field of Classification Search
CPC .................................................. B62D 35/001
See application file for complete search history.

(56) References Cited

U.S. PATENT DOCUMENTS

2,933,344 A 4/1960 Shumaker
3,010,754 A 11/1961 Shumaker
(Continued)

FOREIGN PATENT DOCUMENTS

DE 102008036888A-1 2/2010
EP 0197239 A2 10/1986
WO WO/2013/188669 12/2013

OTHER PUBLICATIONS

Aerodynamic Trailer Systems, LLC SmartTail® The Trucking Industry's First Totally Automated Trailer Air Spoiler from www.ats-green.com/smarttail.htm (2pages), Jan. 13, 2014.
(Continued)

*Primary Examiner* — Lori L Lyjak
(74) *Attorney, Agent, or Firm* — Ice Miller LLP

(57) ABSTRACT

The present embodiments provide a wake convergence device that allows for the increase in pressure of the low pressure region created behind the "square-shaped" trailing edge of a trailer. The present embodiments also reduce the effect of the trailing edge tip vortices and re-streamlines the flow shedding off the sides and top of the semi-trailer. The wake convergence device mounts to an existing trailer with aerodynamic brackets and hinges in a manner that will not impede a trailer's current practical function for loading and unloading of its payload. The wake convergence device efficiently manages the trailer's trailing edge flow because of its positioning that allows a gap between the wake convergence device and the trailer sides or top.

23 Claims, 34 Drawing Sheets

(56) References Cited

U.S. PATENT DOCUMENTS

| | | |
|---|---|---|
| 3,276,811 A | 10/1966 | Schmidt |
| 3,596,975 A | 8/1971 | Stephen |
| 3,960,402 A | 6/1976 | Keck |
| 3,999,787 A | 12/1976 | Park et al. |
| 3,999,797 A | 12/1976 | Kirsch et al. |
| 4,142,755 A | 3/1979 | Keedy |
| 4,214,787 A | 7/1980 | Chain |
| 4,309,053 A | 1/1982 | Lett |
| 4,316,630 A | 2/1982 | Evans |
| 4,320,920 A | 3/1982 | Goudey |
| 4,357,045 A | 11/1982 | Kinford, Jr. |
| 4,417,760 A | 11/1983 | Koch |
| 4,421,354 A | 12/1983 | Lemaster |
| 4,671,555 A | 6/1987 | Linz et al. |
| 4,682,808 A | 7/1987 | Bilanin |
| 4,735,381 A | 4/1988 | Wood |
| 4,809,003 A | 2/1989 | Dominek et al. |
| 4,881,772 A | 11/1989 | Feinberg |
| 5,112,120 A | 5/1992 | Wood et al. |
| 5,199,762 A | 4/1993 | Scheele et al. |
| 5,280,990 A | 1/1994 | Rinard |
| 5,374,013 A | 12/1994 | Bassett et al. |
| 5,382,070 A | 1/1995 | Turner |
| 5,498,059 A | 3/1996 | Switik |
| 5,658,038 A | 8/1997 | Griffin |
| 5,823,610 A | 10/1998 | Ryan et al. |
| 5,901,925 A | 5/1999 | McGrath et al. |
| 5,901,929 A | 5/1999 | Banks |
| 6,092,861 A | 7/2000 | Whelan |
| 6,131,853 A | 10/2000 | Bauer et al. |
| 6,241,302 B1 | 6/2001 | Rehkopf |
| 6,257,654 B1 | 7/2001 | Boivin et al. |
| 6,286,892 B1 | 9/2001 | Bauer et al. |
| 6,485,087 B1 | 11/2002 | Roberge et al. |
| 6,616,218 B2 | 9/2003 | Bauer et al. |
| 6,666,498 B1 | 12/2003 | Whitten |
| 6,685,256 B1 | 2/2004 | Shermer |
| 6,742,616 B2 | 6/2004 | Leban |
| 6,799,791 B2 | 10/2004 | Reiman et al. |
| 6,854,788 B1 | 2/2005 | Graham |
| 6,959,958 B2 | 11/2005 | Basford |
| 6,986,544 B2 | 1/2006 | Wood |
| 7,008,005 B1 | 3/2006 | Graham |
| 7,207,620 B2 | 4/2007 | Cosgrove et al. |
| 7,240,958 B2 | 7/2007 | Skopic |
| 7,255,387 B2 | 8/2007 | Wood |
| 7,318,620 B2 | 1/2008 | Wood |
| 7,431,381 B2 | 10/2008 | Wood |
| 7,484,791 B1 | 2/2009 | Chen |
| 7,537,270 B2 | 5/2009 | O'Grady |
| 7,585,015 B2 | 9/2009 | Wood |
| 7,618,086 B2 | 11/2009 | Breidenbach |
| 7,625,034 B1 | 12/2009 | Fitzgerald |
| 7,641,262 B2 | 1/2010 | Nusbaum |
| 7,699,382 B2 | 4/2010 | Roush |
| 7,740,304 B1 | 6/2010 | Breu |
| 7,748,771 B2 | 7/2010 | Distel et al. |
| 7,765,044 B2 | 7/2010 | Neuburger |
| 7,784,854 B2 | 8/2010 | Breidenbach |
| 7,837,254 B2 | 11/2010 | Reiman et al. |
| 7,845,708 B2 | 12/2010 | Breidenbach |
| 7,850,224 B2 | 12/2010 | Breidenbach |
| 7,854,468 B2 | 12/2010 | Vogel et al. |
| 7,857,376 B2 | 12/2010 | Breidenbach |
| 7,862,102 B1 | 1/2011 | Benton |
| 7,950,720 B2 | 5/2011 | Skopic |
| 7,976,096 B2 | 7/2011 | Holubar |
| 8,007,030 B2 | 8/2011 | Wood |
| 8,025,329 B1 | 9/2011 | Kron |
| 8,025,330 B2 | 9/2011 | Reiman et al. |
| 8,033,594 B2 | 10/2011 | Nusbaum |
| 8,091,951 B1 | 1/2012 | Fitzgerald |
| 8,100,461 B2 | 1/2012 | Smith et al. |
| 8,136,868 B2 | 3/2012 | Nusbaum |
| 8,177,287 B2 | 5/2012 | Vogel et al. |
| 8,196,993 B2 | 6/2012 | Smith et al. |
| 8,196,994 B2 | 6/2012 | Chen |
| 8,196,995 B2 | 6/2012 | Chen |
| 8,235,456 B2 | 8/2012 | Nusbaum |
| 8,251,436 B2 | 8/2012 | Henderson et al. |
| 8,272,680 B2 | 9/2012 | Breidenbach |
| 8,303,025 B2 | 11/2012 | Senatro |
| 8,342,594 B2 | 1/2013 | Benton |
| 8,342,595 B2 | 1/2013 | Henderon et al. |
| 8,360,507 B2 | 1/2013 | Benton |
| 8,360,509 B2 | 1/2013 | Smith et al. |
| 8,360,510 B2 | 1/2013 | Smith et al. |
| 8,382,194 B2 | 2/2013 | Wood |
| 8,480,161 B2 | 7/2013 | Pfaff |
| 8,480,162 B2 | 7/2013 | Breidenbach |
| 8,491,036 B2 | 7/2013 | Henderson et al. |
| 8,492,036 B2 | 7/2013 | Kim et al. |
| 8,579,357 B2 | 11/2013 | Nusbaum |
| 8,622,461 B2 | 1/2014 | Breidenbach |
| 8,672,391 B1 | 3/2014 | Cobb |
| 8,684,447 B2 | 4/2014 | Henderson et al. |
| 8,697,047 B2 | 4/2014 | LeBuannec et al. |
| 8,708,399 B2 | 4/2014 | Smith et al. |
| 8,746,779 B1 | 6/2014 | Mazyan |
| 8,770,649 B2 | 7/2014 | Praskovsky et al. |
| 8,770,650 B2 | 7/2014 | Brosseau |
| 8,777,297 B2 | 7/2014 | Meredith et al. |
| 8,783,757 B2 | 7/2014 | Henderson et al. |
| 9,139,238 B2 | 9/2015 | Visser |
| 2007/0089531 A1 | 4/2007 | Wood |
| 2008/0116715 A1 | 5/2008 | Steel |
| 2008/0157560 A1 | 7/2008 | Spector |
| 2009/0026797 A1 | 1/2009 | Wood |
| 2009/0236872 A1 | 9/2009 | Wood |
| 2010/0106380 A1 | 4/2010 | Salari et al. |
| 2010/0194144 A1 | 8/2010 | Sinha |
| 2011/0115254 A1 | 5/2011 | Skopic |
| 2012/0126572 A1 | 5/2012 | Hjelm et al. |
| 2012/0292495 A1 | 11/2012 | Hashimoto et al. |
| 2012/0292945 A1 | 11/2012 | Nusbaum |
| 2013/0076063 A1 | 3/2013 | Ryan et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0214557 A1 | 8/2013 | Smith et al. |
| 2014/0019010 A1 | 1/2014 | Smith et al. |
| 2014/0117713 A1 | 5/2014 | Baker |
| 2015/0035312 A1 | 2/2015 | Grandominico et al. |
| 2015/0166129 A1 | 6/2015 | Camosy |
| 2015/0329152 A1 | 11/2015 | Baker et al. |
| 2016/0046333 A1 | 2/2016 | Baker |

OTHER PUBLICATIONS

Kodiak Innovations—"Bumper Bullet" from www.slipstreemaero.com (2 pages), Jan. 13, 2014.
Aerovolution—Revolutionary Inflatable Aerodynamic Solutions from www.aerovolution.com/information.shtml (2 pages), Oct. 13, 2014.
SmartTruck New Product Release: Low Profile Side Fairings Changing the Shape of Trucking, slide show for Mid-America Trucking Show, (7 pages), Mar. 21-23, 2013.
Trailer Fairings Be Road Smart from www.beroadsmart.com/Vortex_Generators-2.html (2 pages), Jan. 9, 2014.
Solus Aero Package from www.solusinc.com/aero.html (2 pages), Jan. 9, 2014.
Spoiler from www.ats-green.com/smarttail.htm (2 pages), May 8, 2015.
PCT/US2013/045661 International Search Report dated Nov. 14, 2013 (2 pages).
PCT/US2013/045661 Written Opinion of the International Searching Authority dated Nov. 14, 2013 (5 pages).
PCT/US2013/045661 International Preliminary Report on Patentability dated Nov. 14, 2013 (6 pages).

(56) References Cited

OTHER PUBLICATIONS

Office Action U.S. Appl. No. 14/928,056 dated Jan. 27, 2016 (10 pages).

Office Action U.S. Appl. No. 14/407,674 dated Feb. 17, 2016 (10 pages).

EP 13803764 Supplementary European Search Report, Jan. 26, 2016.

EP 13803764 Written Opinion of the Supplementary European Search Report, Jan. 26, 2016.

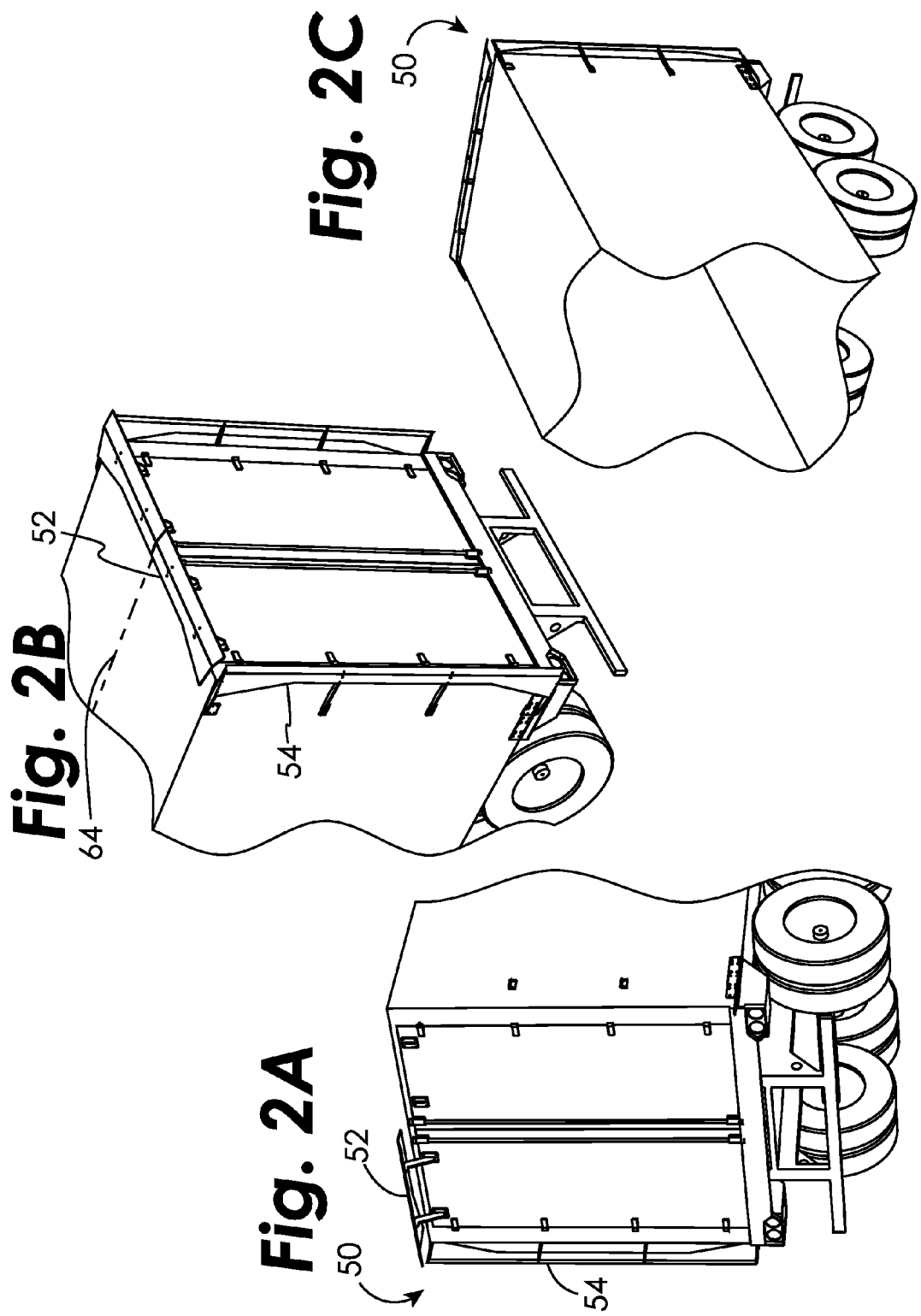

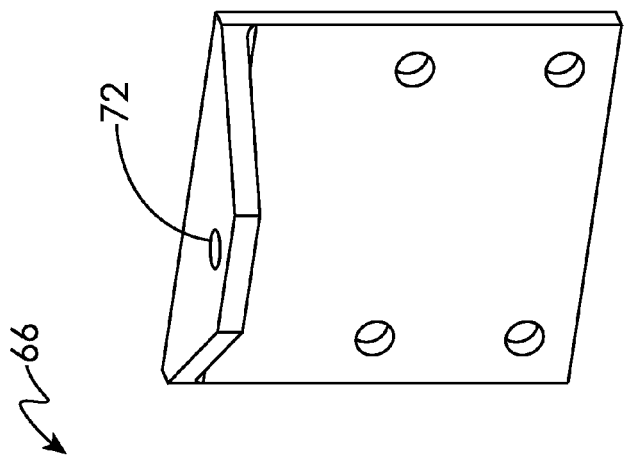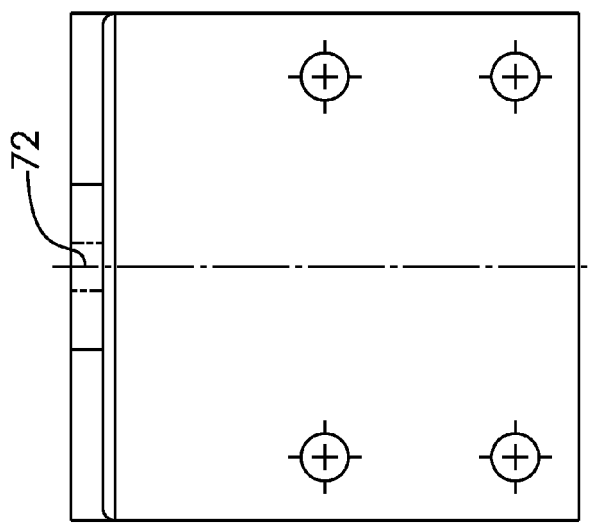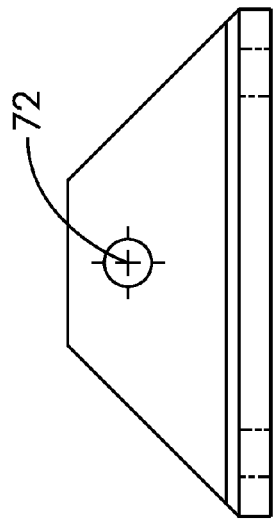
Fig. 8

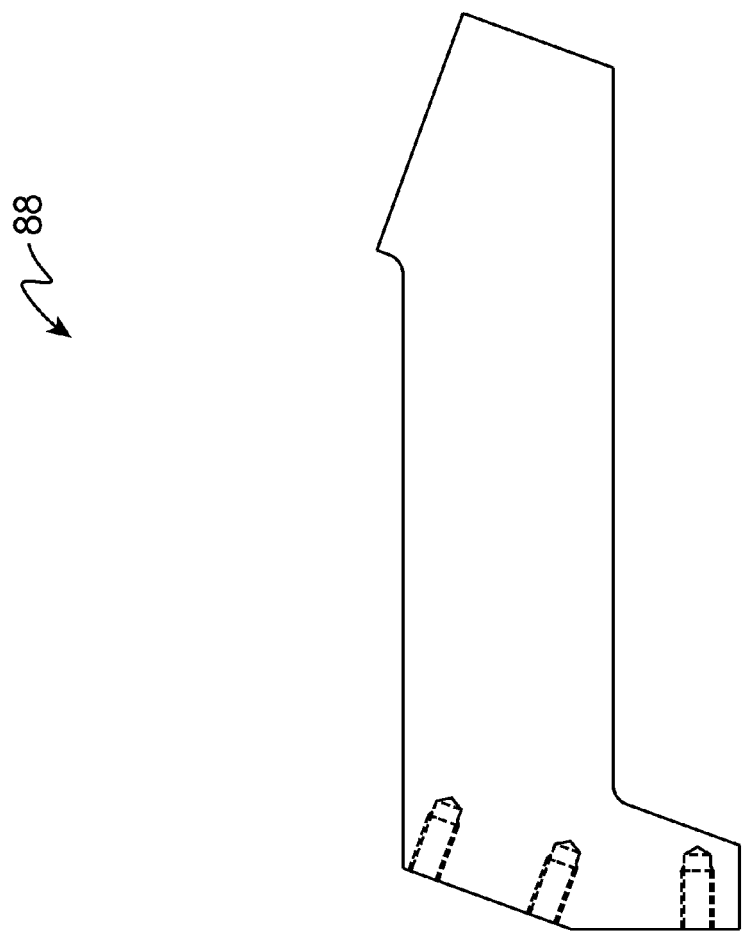
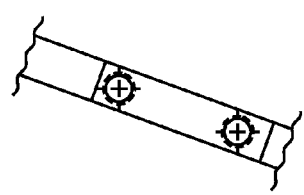
Fig. 14

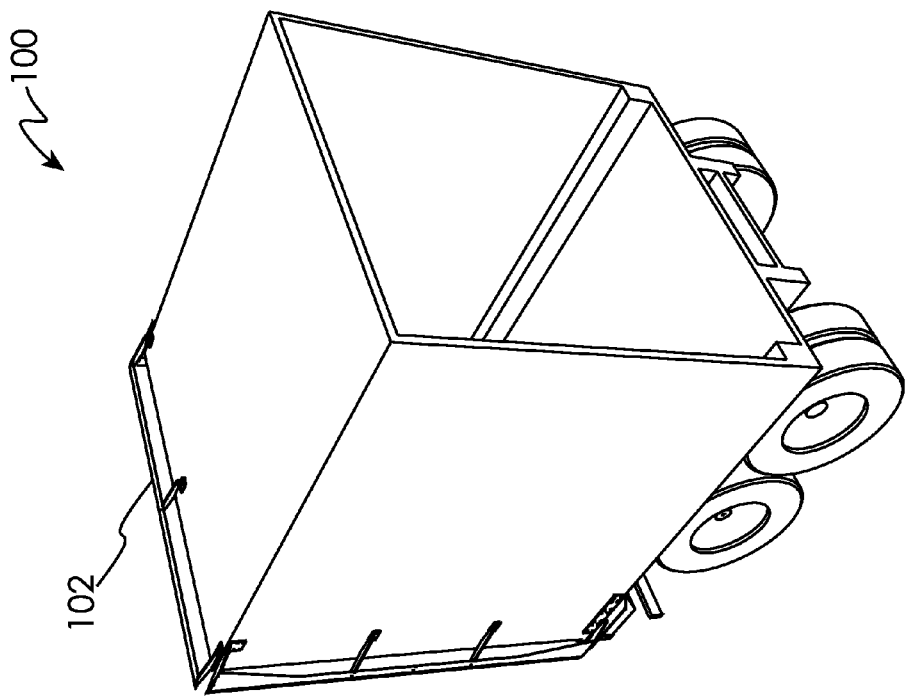
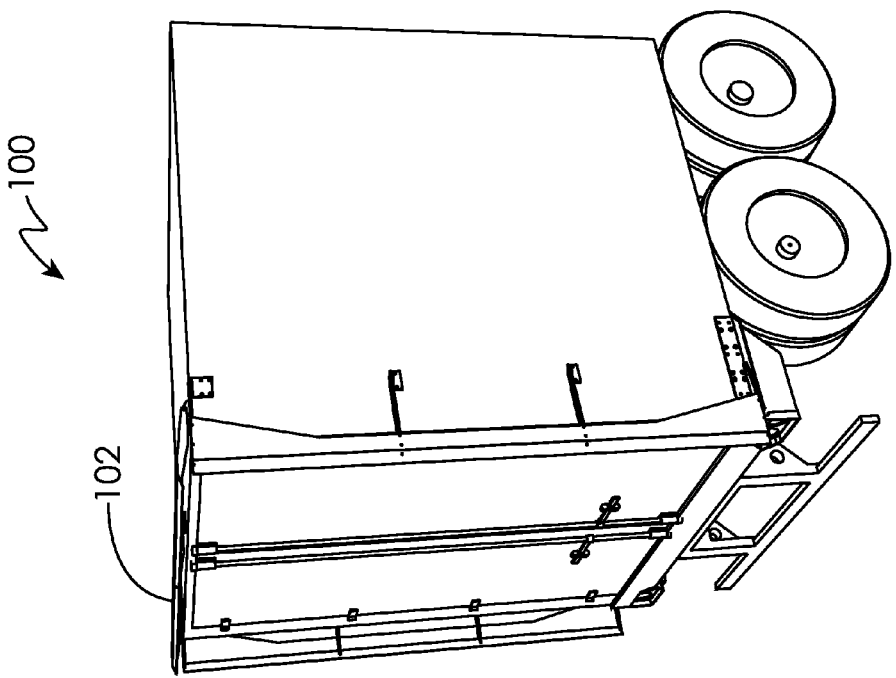
Fig. 16

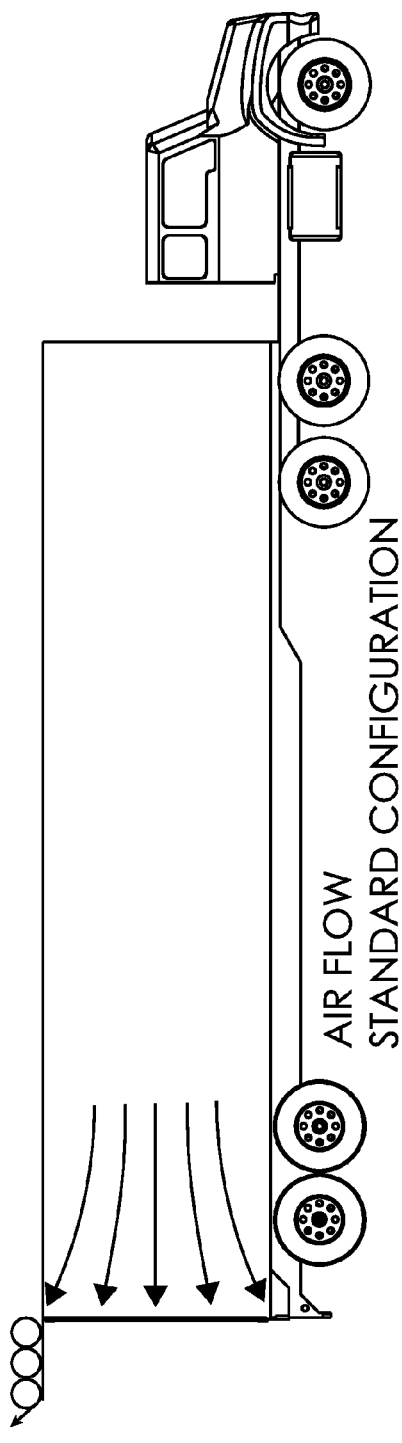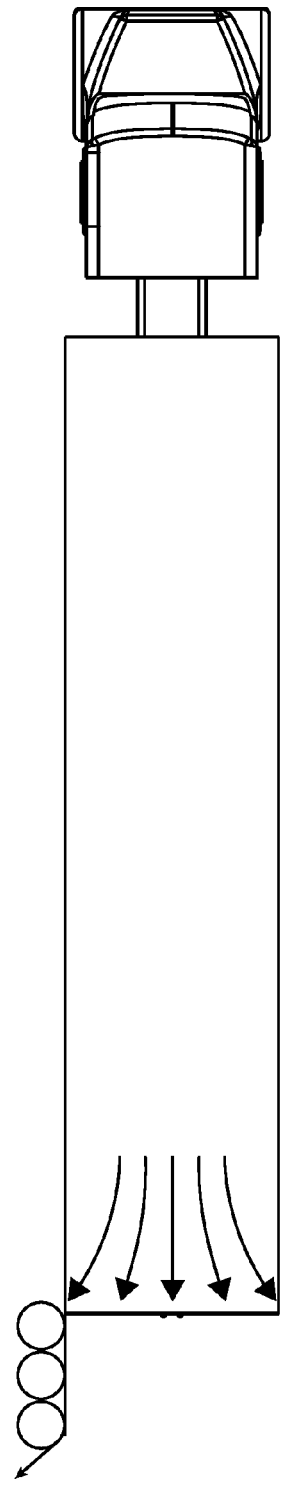
Fig. 19A  AIR FLOW STANDARD CONFIGURATION
Fig. 19B  AIR FLOW TOP VIEW STANDARD CONFIGURATION

AIR FLOW WITH WAKE CONVERGENCE DEVICE

AIR FLOW TOP VIEW WITH WAKE CONVERGENCE DEVICE

WAKE CONVERGENCE DEVICE FOR A VEHICLE

CROSS-REFERENCE TO RELATED APPLICATIONS

The present application is the National Stage of International Application No. PCT/US2013/045661 filed Jun. 13, 2013 and having the title WAKE CONVERGENCE DEVICE FOR A VEHICLE which is a non-provisional of and claims priority to both U.S. Provisional Patent Application No. 61/658,959 filed Jun. 13, 2012 and having the title REAR-END TREATMENT FOR A SEMI-TRUCK TRAILER and U.S. Provisional Patent Application No. 61/774,048 filed Mar. 7, 2013 and having the title WAKE CONVERGENCE DEVICE FOR A VEHICLE the entirety of each of which is incorporated by reference herein.

TECHNICAL FIELD OF THE DISCLOSED EMBODIMENTS

The embodiments herein generally relate to aerodynamics for vehicles and, more particularly, to a wake convergence device for a vehicle.

BACKGROUND OF THE DISCLOSED EMBODIMENTS

Over the years, the cost of rising fuel has become more and more of a concern. However, with the increase of fuel costs to over $100 per barrel of oil, the concern over fuel costs has never been greater. The significant rise in fuel costs coupled with the federal government's strategy of becoming less dependent on foreign oil has led to the federal government (and some state governments) beginning the process of tightening semi-truck regulations with regard to this particular industry's fuel efficiency. A significant way of improving fuel economy on any vehicle is through improving the vehicle's aerodynamic efficiencies (mainly through aerodynamic drag reduction).

The trucking industry plays a significant role in our country's day to day functioning. A key for the trucking industry is the ability to transport as much product as possible per payload (i.e. cubing out each load). Therefore, removing loading capacity will significantly hurt the performance and functionality of the trucking industry. Because of this, the best aerodynamic improvements will be the ones that allow for the existing payload capacity while these aerodynamic devices are implemented. Aside from payload capacity, an aerodynamic device must be practical and not interfere with day to day operations (i.e. allowing for rear trailer doors to open 225° for loading and unloading). On top of all this, any aerodynamic device must not be a maintenance issue or cost prohibitive.

Several groups have tried to address the needs in this area for semi-trucks over the last many decades with mixed success. Multiple patents have been issued that meet one, or at most two, of the above criteria, but none that meet all of these. This is mostly due to the developmental techniques available throughout these different patent filing times. For the first time in U.S. history, a semi-truck can now be modeled in a very accurate way under severely controlled conditions.

The use of a rolling road wind tunnel and a ⅛ scale semi-truck model has revolutionized the ability for fuel economy improvements in the trucking industry. Until 2008, the best developmental practice in the trucking industry was through actual on-road testing. Real world on-road testing could not allow the developer the ability to control testing variables and led to a large lack of accuracy. Some of the uncontrollable variables include, but are not limited to, driver, traffic, ambient conditions, fuel measurement accuracies, cross wind, tire degradation, engine efficiencies, payload capacities, route differences, altitude differences and many more. All of these variables are controlled with rolling road wind tunnel testing.

NASA built a ⅛ scale semi-truck model and tested it in various wind tunnels throughout the U.S. including a Reynolds sweep tunnel. All of these wind tunnels were fixed floor (i.e. non-rolling road). NASA's conclusions were that a ⅛ scale model of a semi-truck could accurately represent the real world airflows if tested with a Reynolds number above 1.1M. An identical NASA model (NASA provided the detailed manufacturing drawings) was built and the next progressive step of testing this ⅛ scale semi-truck model with a rolling road wind tunnel above Re=1.1M was taken. The results of this ground breaking work conclusively showed that without a rolling road (and rotating wheel) testing environment over 85% of the items tested gave an opposite performance trend than was witnessed in a fixed floor wind tunnel environment. This meant that 85% of the items developed in a fixed floor wind tunnel actually increased the drag of the vehicle instead of reducing the drag even though the results from the fixed wind floor tunnel tests showed an over-all drag reduction. This one rolling road test changed the outlook for the future of semi-truck development.

Because testing in a rolling road wind tunnel allows all of the real-world testing variables to be controlled, rolling road wind tunnel testing allows for an accuracy of 0.25% changes in fuel economy to be measured (as opposed to 1-1.5% with on road under the strictest of conditions). Therefore, utilizing a rolling road wind tunnel has become the most cost effective way to develop the semi-truck aerodynamics.

Prior art shows details of turning vanes at the trailing edges of semi-trailers. Some do not allow for the doors to be opened to the standard 225°. Others actually do not give any aerodynamic benefit. The placement of aerodynamic devices is critical to their success. Some of the prior art has attached turning vanes that do not allow a gap between the vane and the trailer. These concepts are essentially extending the trailing edge of the trailer and simply increasing the corner radii.

U.S. Pat. No. 3,960,402 describes vehicle flow direction vanes for reducing the rear vacuum induced drag on moving vehicles. This patent does not offer the 20% improvement in mileage as claimed (which would actually require a 40% over all drag reduction). At best, this vane provides 0.5% improvement in fuel economy as measured in a rolling road wind tunnel. This device also does not allow the trailer doors to open 225° for loading and unloading. This device also includes angles of 30° of curvature for its peak performance. This device claims to create a "high velocity cone" at the rear of the trailer but does not improve the tip shedding.

U.S. Pat. No. 3,999,797, describes an airvane for use with bluff vehicles which is used to reduce separation to reduce air drag and buffeting of the vehicle. This prior art claims an airvane that mounts on the front and rear of the top and sides of a trailer. These mountings are permanent and do not allow the trailer doors to open 225° for their normal usage. It is also claimed that these devices must work in concert with each other. This device does not give the claimed drag reduction.

U.S. Pat. No. 7,240,958 B2 refers to an apparatus with flexible attachments for reducing the drag on a vehicle having a generally planar surface. The connections, or flexible attachments utilize cables mounted to vanes. This patent basically claims the use of only rear mounted vanes on the semi-trailer for drag reduction. This device does not give the claimed drag reduction.

SUMMARY OF THE DISCLOSED EMBODIMENTS

In one embodiment, a wake convergence device for a trailer is provided. The wake convergence device is spaced from the top of a trailer and from the sides of the trailer. The wake convergence device includes an outboard tapered leading edge that transitions from forward to aft of a rear of a trailer. The wake convergence device may be formed from a planar material and may include a bend therein. The wake convergence device has trailing edges bent toward a trailer centerline. The wake convergence device side panels may include aerodynamic brackets and hinges that connect the side panel to the side of the trailer. In one embodiment, the wake convergence device allows the doors of the trailer to open 225°.

In one embodiment, a wake convergence device for a vehicle is provided including a top panel positioned above and spaced from a top of the vehicle. The top panel includes flared ends that transition a leading edge of the top panel from forward of a vehicle trailing edge to aft of the vehicle trailing edge. A pair of side panels are provided, wherein each side panel is positioned along and spaced from a side of the vehicle. Each side panel includes flared ends that transition a leading edge of the side panel from forward of the vehicle trailing edge to aft of the vehicle trailing edge. Each side panel is hingedly attached to the side of the vehicle so that the side panels rotate toward a front of the vehicle.

In one embodiment, a wake convergence device for a vehicle is provided including a top panel positioned above and spaced from a top of the vehicle. The top panel includes flared ends that transition a leading edge of the top panel from forward of a vehicle trailing edge to aft of the vehicle trailing edge. The flared ends of the top panel extend forward from an axis of the top panel. A pair of side panels are provided, wherein each side panel is positioned along and spaced from a side of the vehicle. Each side panel includes flared ends that transition a leading edge of the side panel from forward of the vehicle trailing edge to aft of the vehicle trailing edge. The flared ends of each side panel extend forward from an axis of the side panel.

In one embodiment, a method of directing streamline flow to a rear of a vehicle is provided. The method includes positioning a top panel above a top of the vehicle so that the top panel is spaced from the top of the vehicle. The method also includes flaring the ends of the top panel to transition a leading edge of the top panel from forward of a vehicle trailing edge to aft of the vehicle trailing edge. The flared ends of the top panel extend forward from an axis of the top panel. A side panel is positioned along each side of the vehicle so that each side panel is spaced from the side of the vehicle. The ends of each side panel are flared to transition a leading edge of the side panel from forward of the vehicle trailing edge to aft of the vehicle trailing edge. The flared ends of each side panel extend forward from an axis of the side panel.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 2A is a rear perspective view of the wake convergence device installed on a trailer.

FIG. 2B is a side perspective view of the wake convergence device installed on the trailer.

FIG. 2C is a front perspective view of the wake convergence device installed on the trailer.

FIG. 8 is a plurality of views of a top mounting bracket for the side panel.

FIG. 14 is a plurality of views of a mounting bracket for the top panel.

FIG. 16A is a rear perspective view of a wake convergence device formed in accordance with another embodiment and in a rolling position.

FIG. 16B is a front perspective view of the wake convergence device shown in FIG. 16A and in a rolling position.

FIG. 19A is a side view of the airflow along the side of a trailer having no wake convergence device.

FIG. 19B is a top view of the airflow along the top of a trailer having no wake convergence device.

DETAILED DESCRIPTION OF THE DISCLOSED EMBODIMENTS

Figure 1:
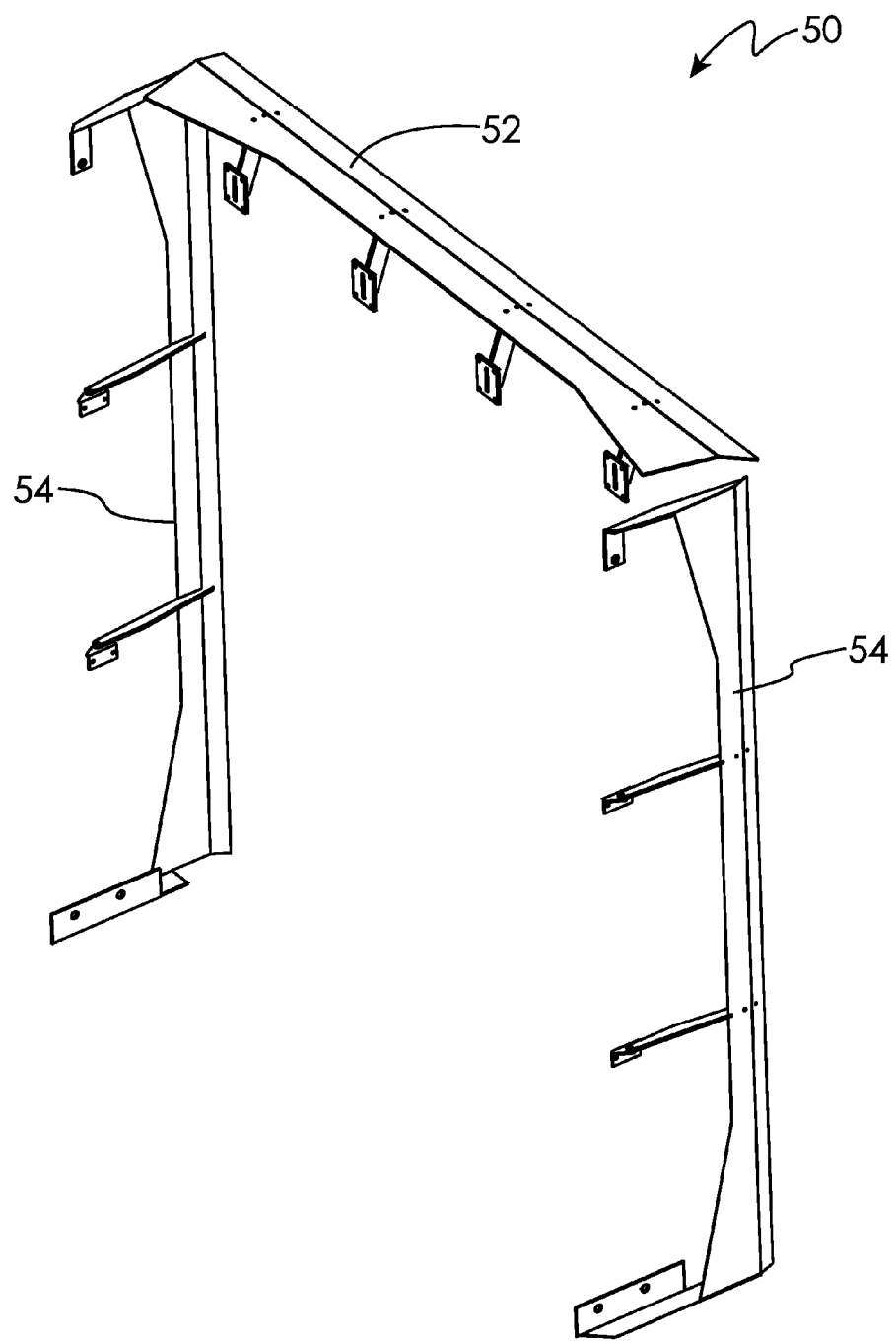
FIG. 1 is a perspective view of a wake convergence device formed in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

FIG. 1 illustrates a wake convergence device 50 in accordance with an embodiment. The wake convergence device 50 is configured to be attached to the back end of a trailer, for example 53' trailers (as illustrated in FIGS. 2A, 2B, 2C, and 3) and dual pups (28' dual trailers). Although the present embodiment is described with respect to attaching to the back of a trailer, the wake convergence device 50 may be attached to the back end of any vehicle, for example a tanker, a bus, a train, class 8-1 vehicles, or the like. The wake convergence device will: 1) direct streamline flow to the rear of the trailer increasing the pressure in the low pressure wake behind the trailer; 2) straighten the flow curvature on, the sides and top of the trailer to reduce flow mixing and thereby reduce overall vehicle turbulence shedding; 3) reduce corner vortex shedding strength at all four corners of the trailer's trailing edge; 4) reduce vehicle trailing edge spray; 5) reduce overall vehicle buffeting; and 6) reduce mechanical drag. The wake convergence device 50 is further designed to be optionally used with a trailer skirt (not shown). The advantages of the trailer skirt and the wake convergence device 50 when used together are greater than the sum of their individual advantages. In other words, a synergy may be obtained when using the combination of the trailer skirt and the wake convergence device 50 together.

Figure 5:
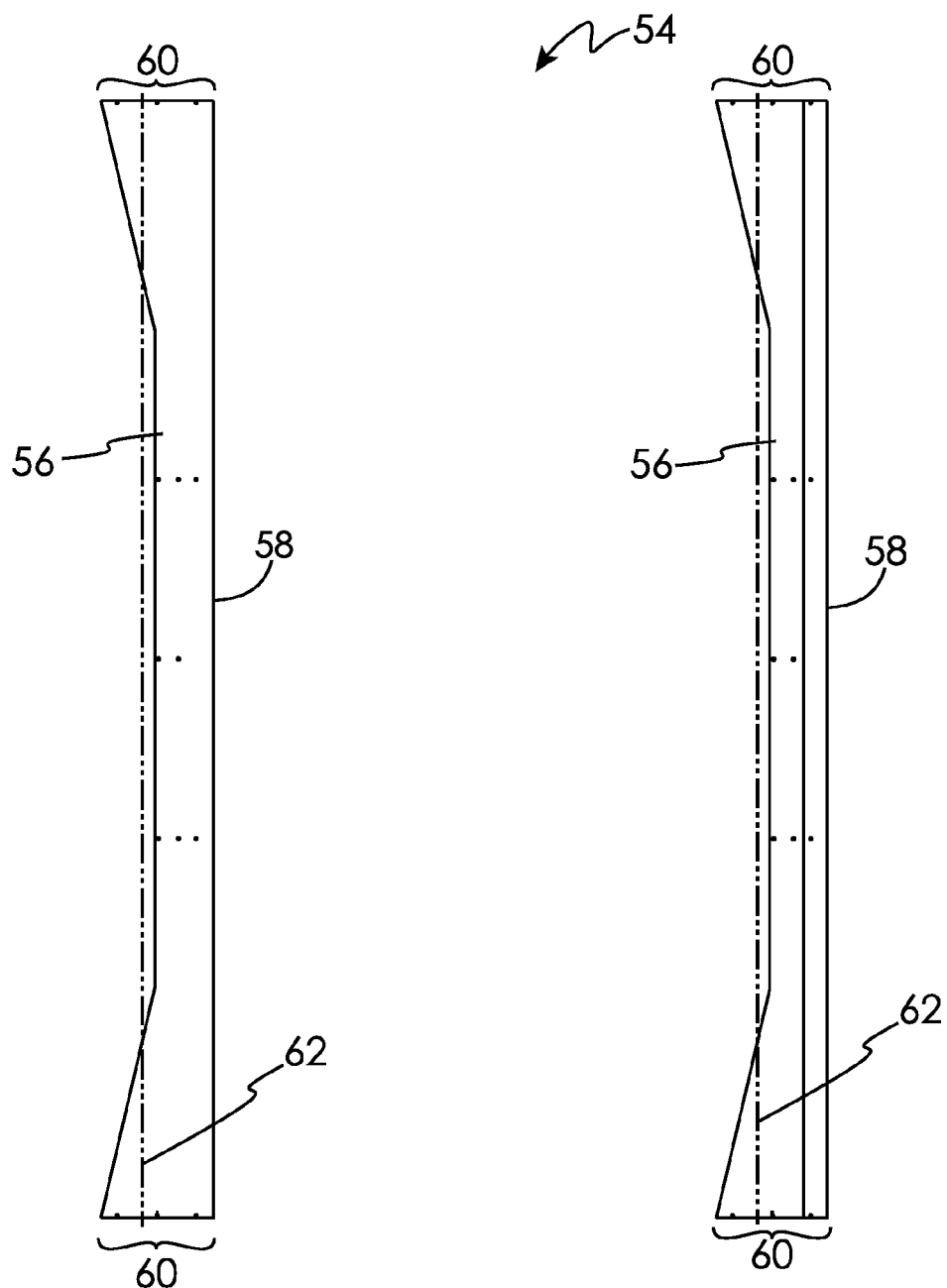
FIG. 5 is a side view of a side panel of the wake convergence device.

The wake convergence device 50 includes a top panel 52 and two side panels 54 (although the panels may be formed in multiple discrete sections). These panels 52, 54 may be attached to the trailer using aerodynamic brackets and hinges to further improve the aerodynamic benefits of the wake convergence device 50. One embodiment of the side panels 54 are illustrated in FIG. 5. The side panels 54 include a planar leading edge 56 (facing the front of the vehicle) and a trailing edge 58. The leading edge 56 includes angled ends 60 that flare forward from a side panel axis 62 extending collinearly with the leading edge 56 at a center of the side panel 54. The trailing edge 58 of the side panel 54 angles inward from the leading edge 56. In particular, when positioned on the trailer, the trailing edge 58 angles toward a centerline 64 of the trailer (illustrated in FIG. 2B). In one embodiment, the angle between a first portion of the side panel 54 including the leading edge 56 and a second portion of the side panel 54 including the trailing edge 58 is 160°.

Figure 6:
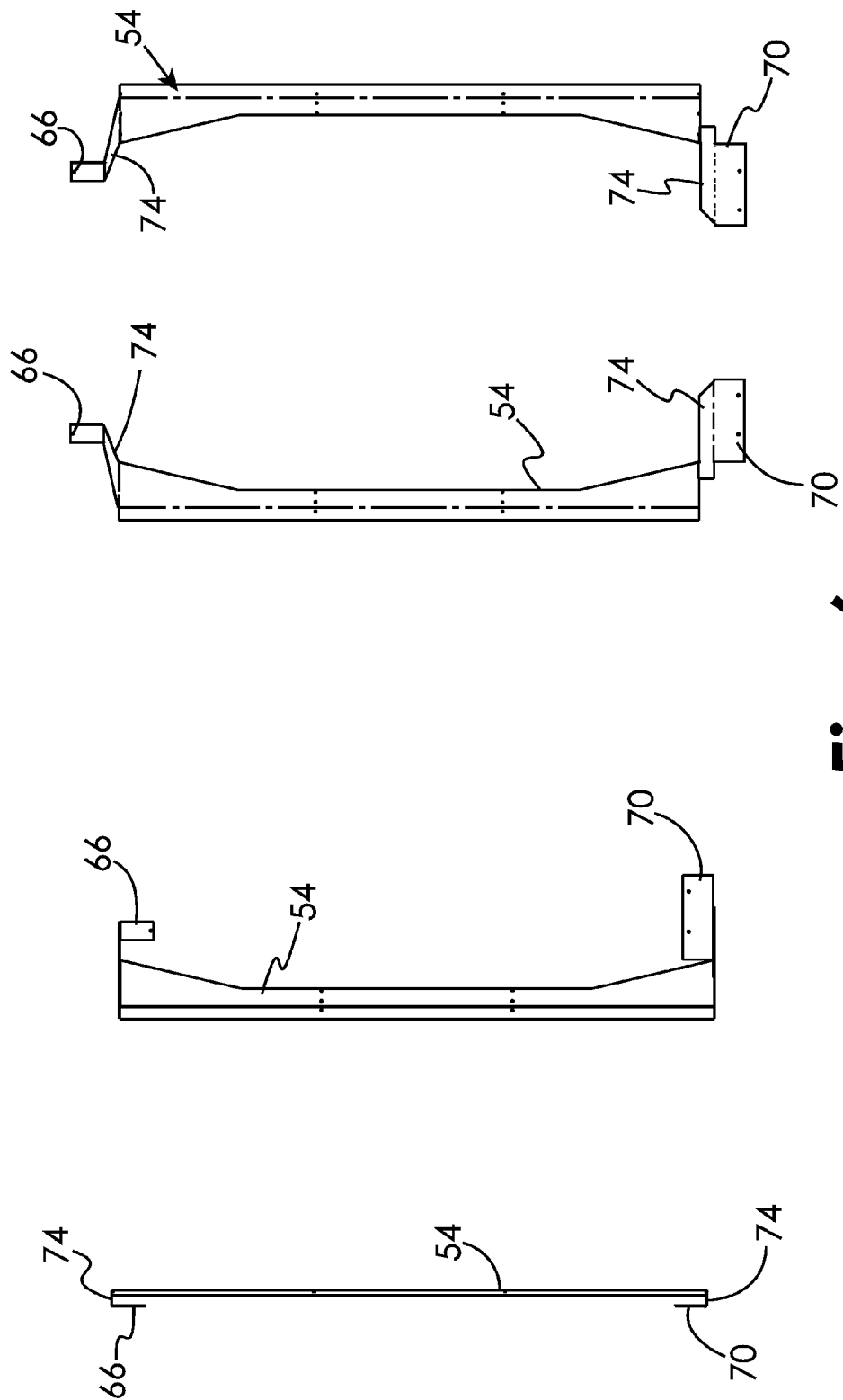
FIG. 6 is a plurality of views of the side panel having the mounting brackets installed.
Figure 7:
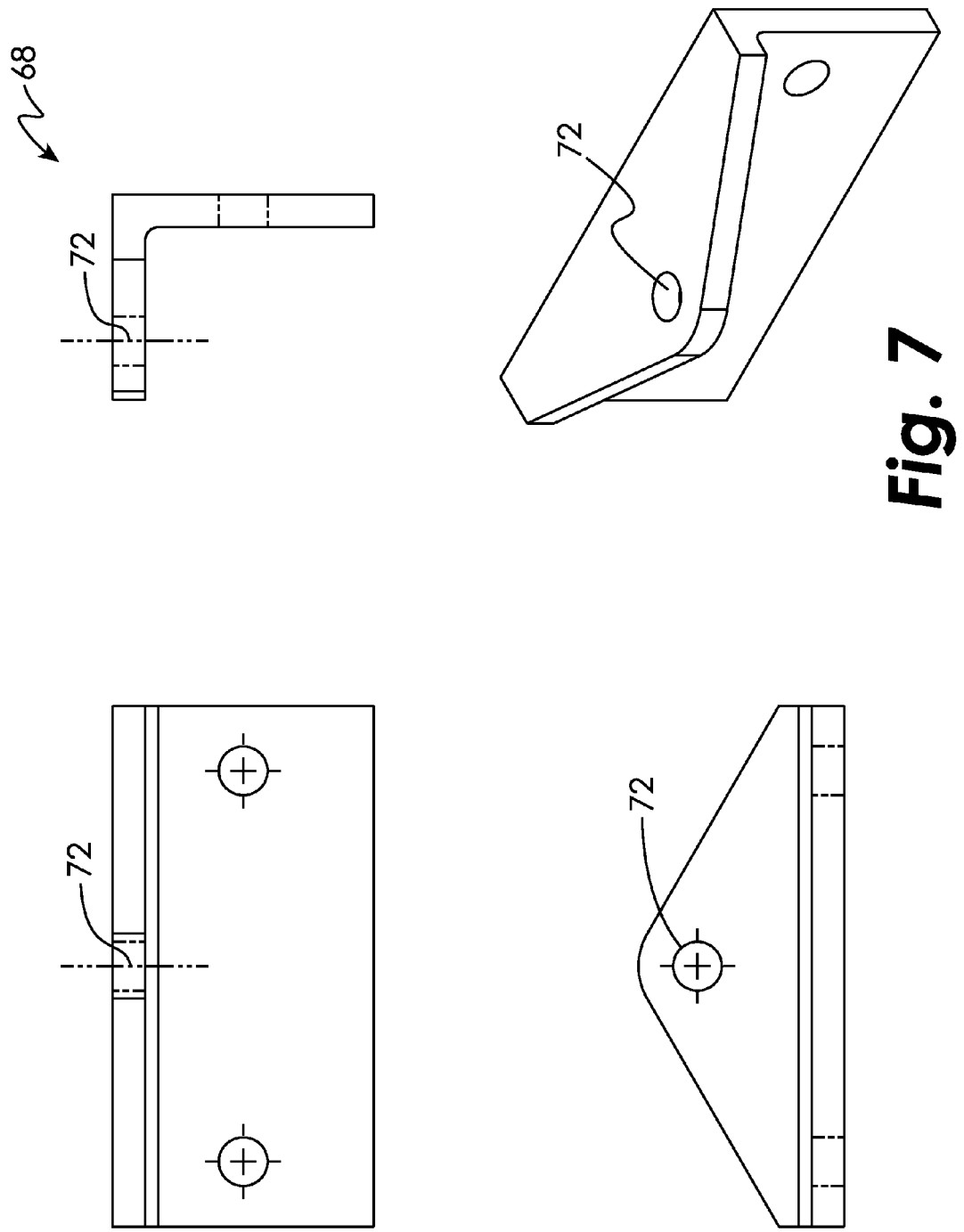
FIG. 7 is a plurality of views of a mid mounting bracket for the side panel.
Figure 9:
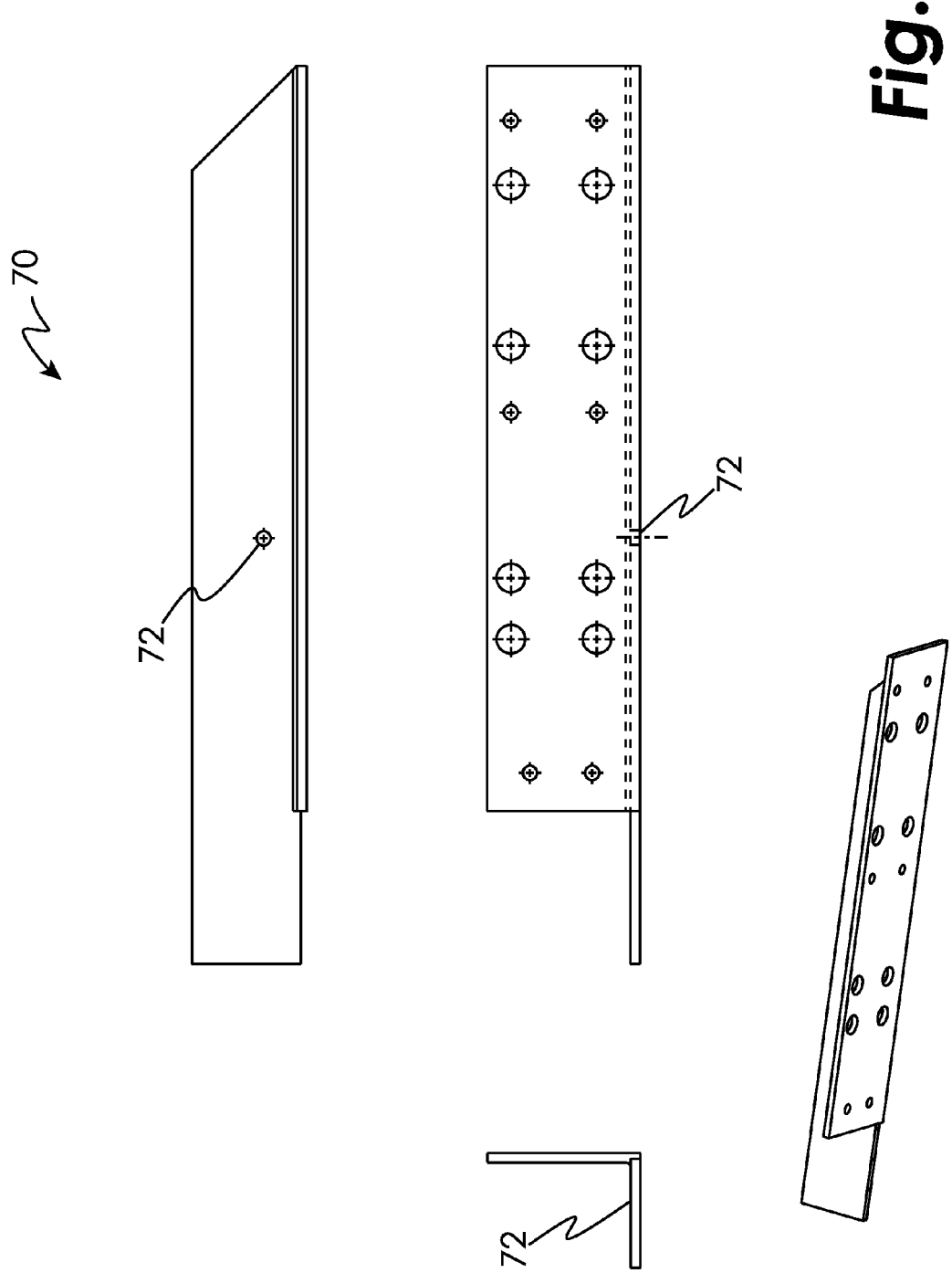
FIG. 9 is a plurality of views of a bottom mounting bracket for the side panel.
Figure 10:
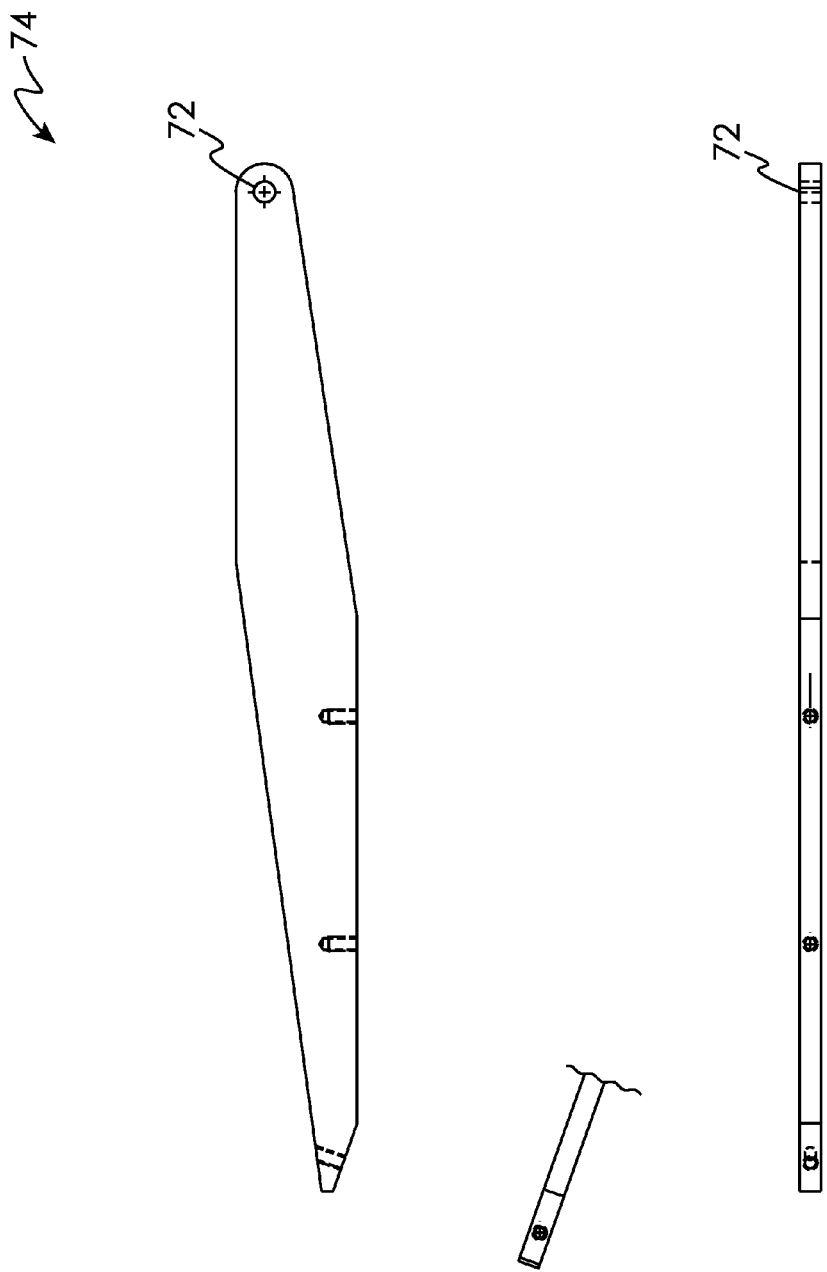
FIG. 10 is a plurality of views of an end hinge for the side panel.

The side panel 54 is attached to the side of the trailer with mounting brackets. In one embodiment, the side panel 54 is attached to the side of the trailer with a top mounting bracket 66 (shown in FIG. 8), a pair of mid mounting brackets 68 (shown in FIG. 7), and a bottom mounting bracket 70 (shown in FIG. 9). The mounting brackets may be coupled by any desired means such as bolting, welding, etc. to the trailer and each include an opening 72 for a hinge pin. End hinges 74 (shown in FIG. 10) are bolted or welded to the side panel 54 and secured to the top and bottom mounting brackets 66, 70 with a hinge pin received through the hinge pin openings 72. The side panel 54 having the end hinges 74 and the top and bottom mounting brackets 66, 70 attached is illustrated in FIG. 6.

Figure 4:
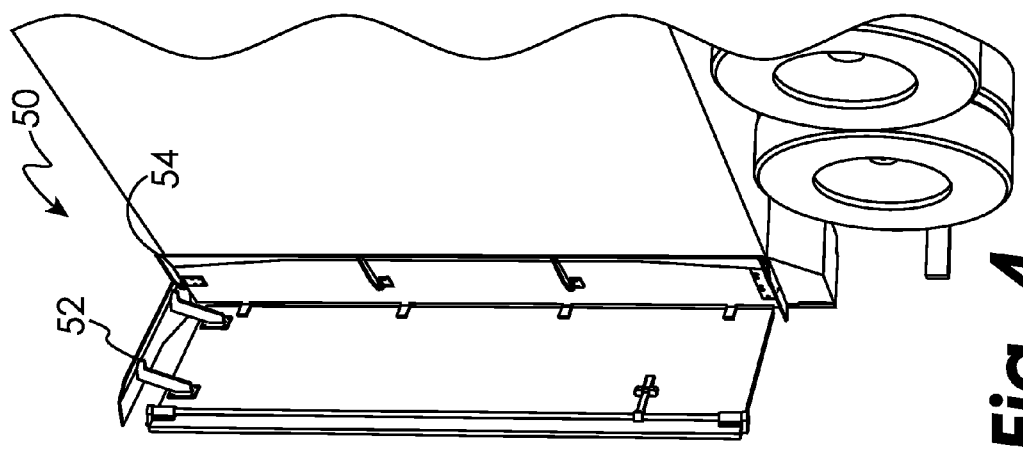
FIG. 4 is a rear perspective view of the wake convergence device installed on a trailer and in an open position.
Figure 3:
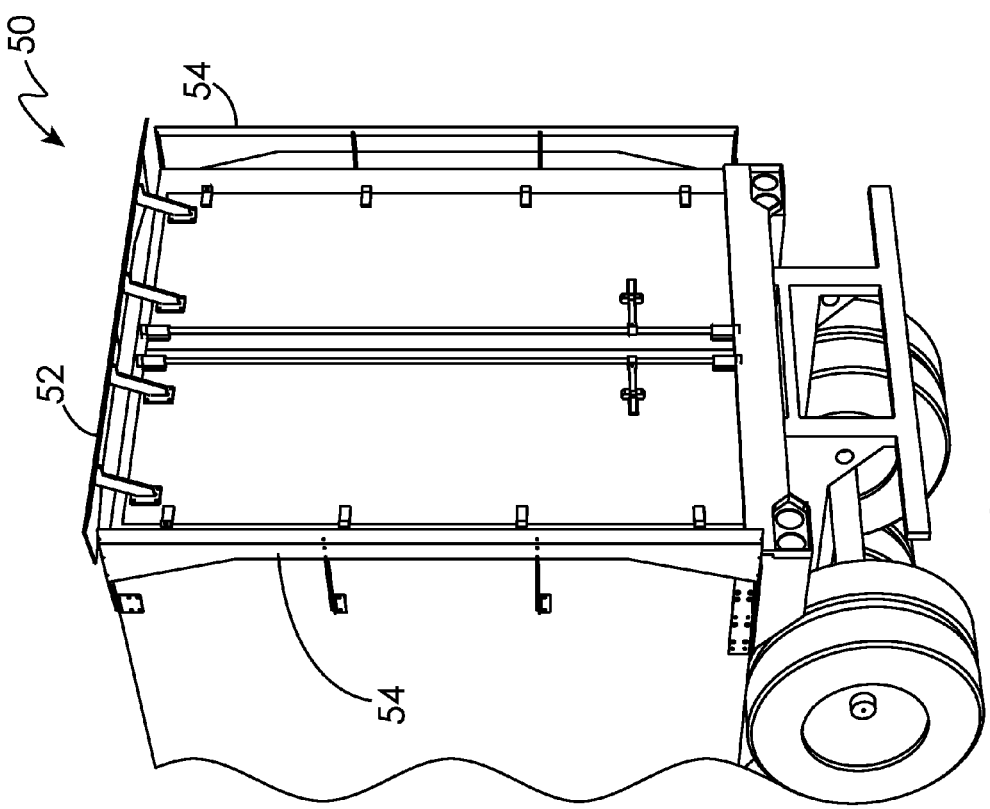
FIG. 3 is a rear perspective view of the wake convergence device installed on a trailer and in a rolling position.
Figure 11:
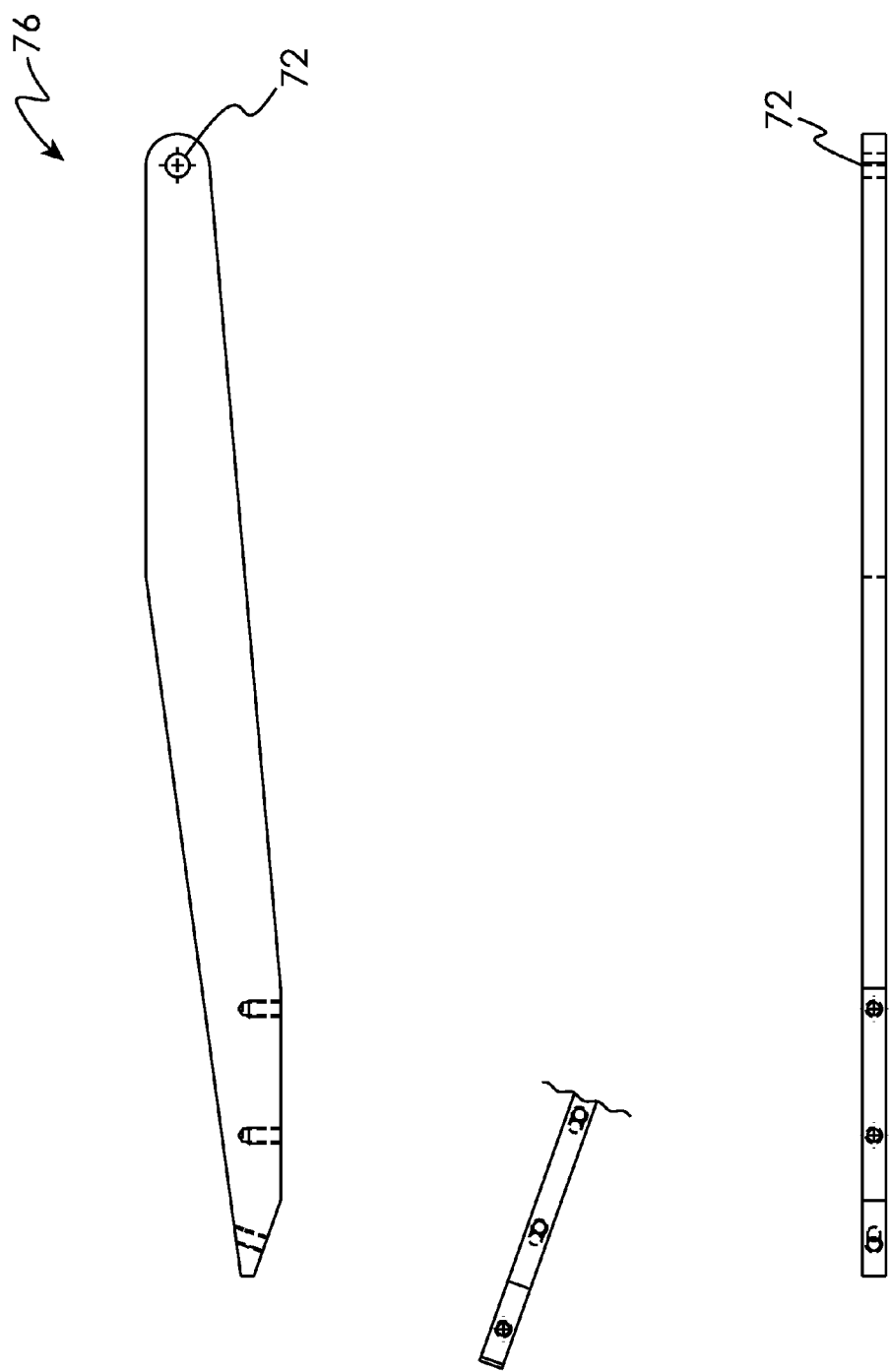
FIG. 11 is a plurality of views of a mid hinge for the side panel.

The mid brackets 68 may be bolted, welded, or the like to the side of the trailer evenly spaced between the top and bottom brackets 66, 70. In one embodiment, the spacing of the mid brackets 68 may be altered to achieve improved aerodynamics. The mid brackets 68 include a hinge pin opening 72 therethrough. A mid hinge 76 (shown in FIG. 11) may be bolted, welded, or the like to the side panel 54 and may be hingedly coupled to the mid bracket 68 via a hinge pin received through the hinge pin opening 72. The hinges on the side panel 54 allow the side panels to open as illustrated in FIG. 4 to allow the doors of the trailer to open "full swing" to 225°.

Figure 12:
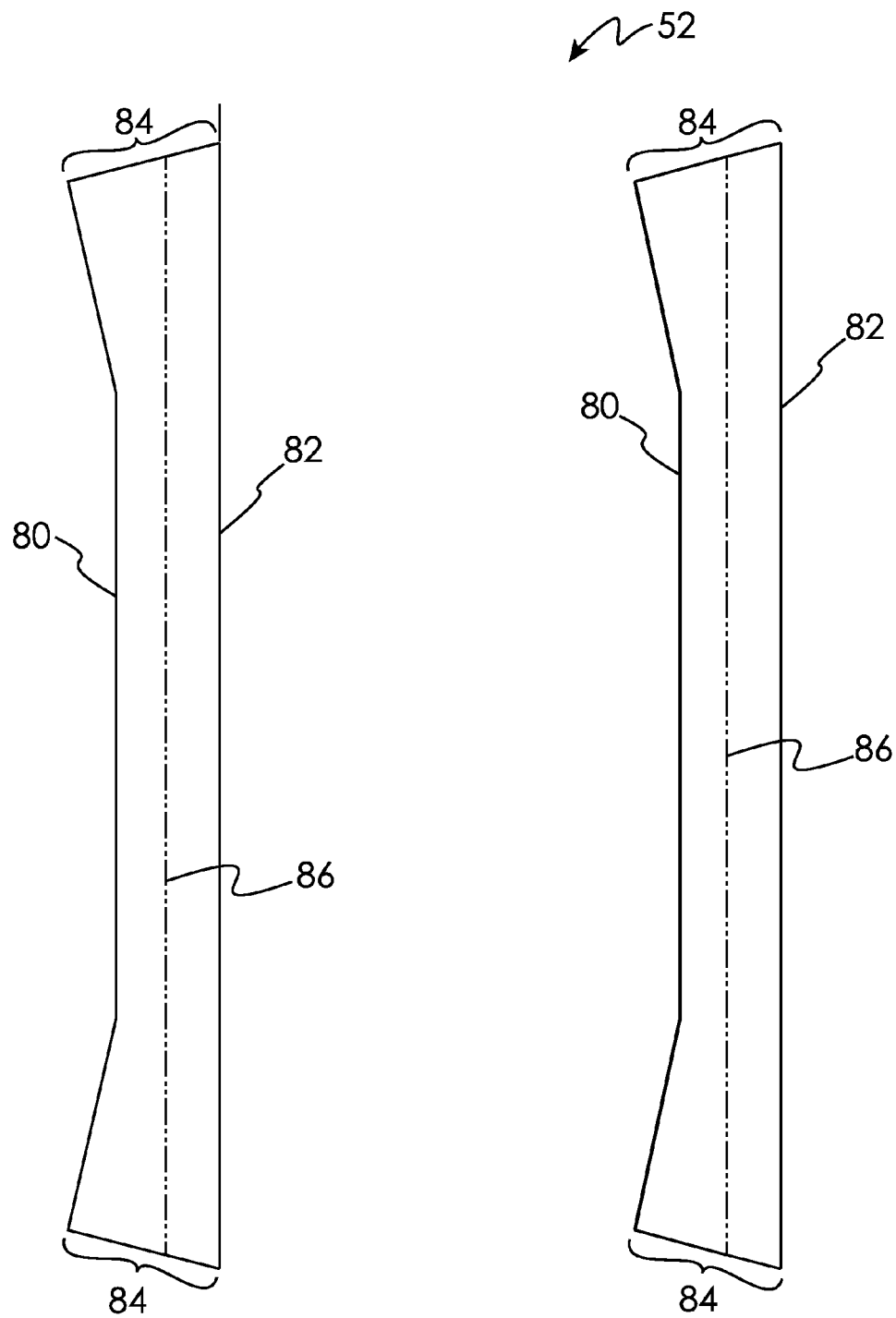
FIG. 12 is a top view of a top panel of the wake convergence device.
Figure 13:
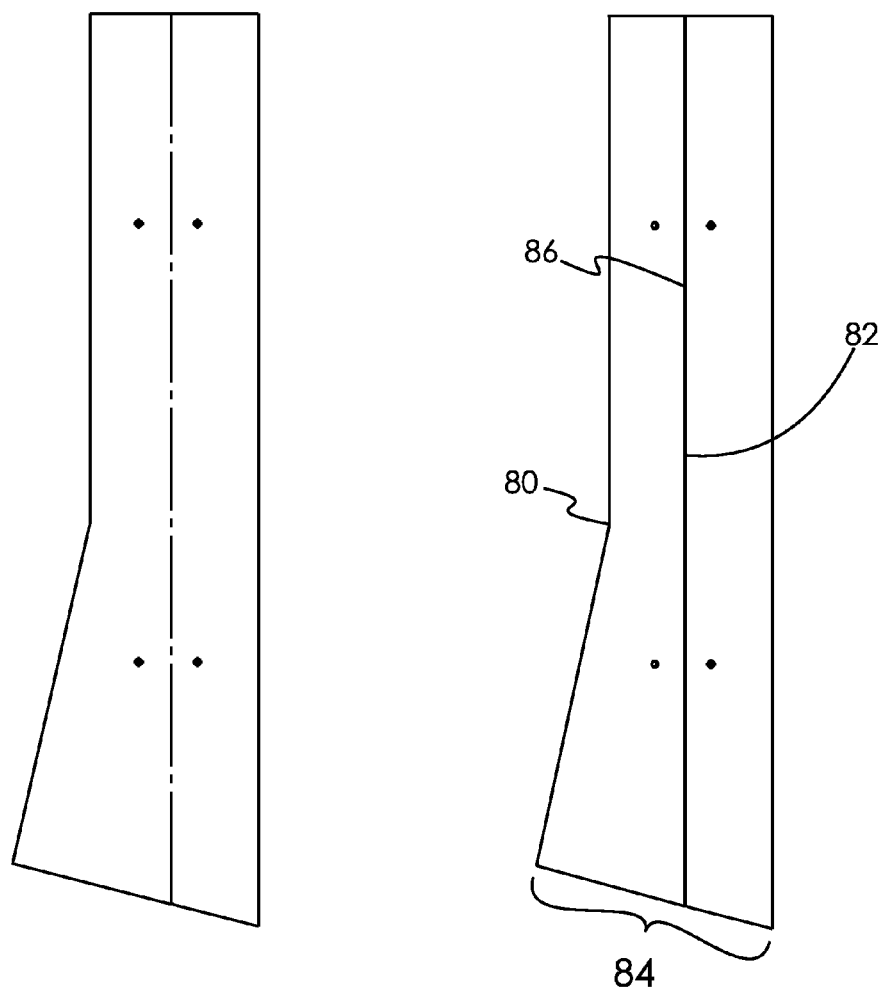
FIG. 13 is a top view of a top panel half of the wake convergence device.

A full top panel 52 is illustrated in FIG. 12, and may comprise two half top panels 78 illustrated in FIG. 13. The top panel 52 is attached to the rear doors of the trailer. In particular, each half top panel 78 is attached to one of the rear doors to allow the doors to open. The top panel halves 78 swing open with the doors as illustrated in FIG. 4. The top panel 52 includes a planar leading edge 80 and a trailing edge 82. The leading edge 80 includes angled ends 84 that flare forward from a top panel axis 86 extending collinearly with the leading edge 80 at a center of the top panel 52. The trailing edge 82 of the top panel 52 angles inward from the leading edge 80. In particular, when positioned on the trailer, the trailing edge 82 angles toward the centerline 64 of the trailer. In one embodiment, the angle between a first portion of the top panel 52 including the leading edge 80 and a second portion of the top panel 52 including the trailing edge 82 is 160 degrees.

Figure 15:
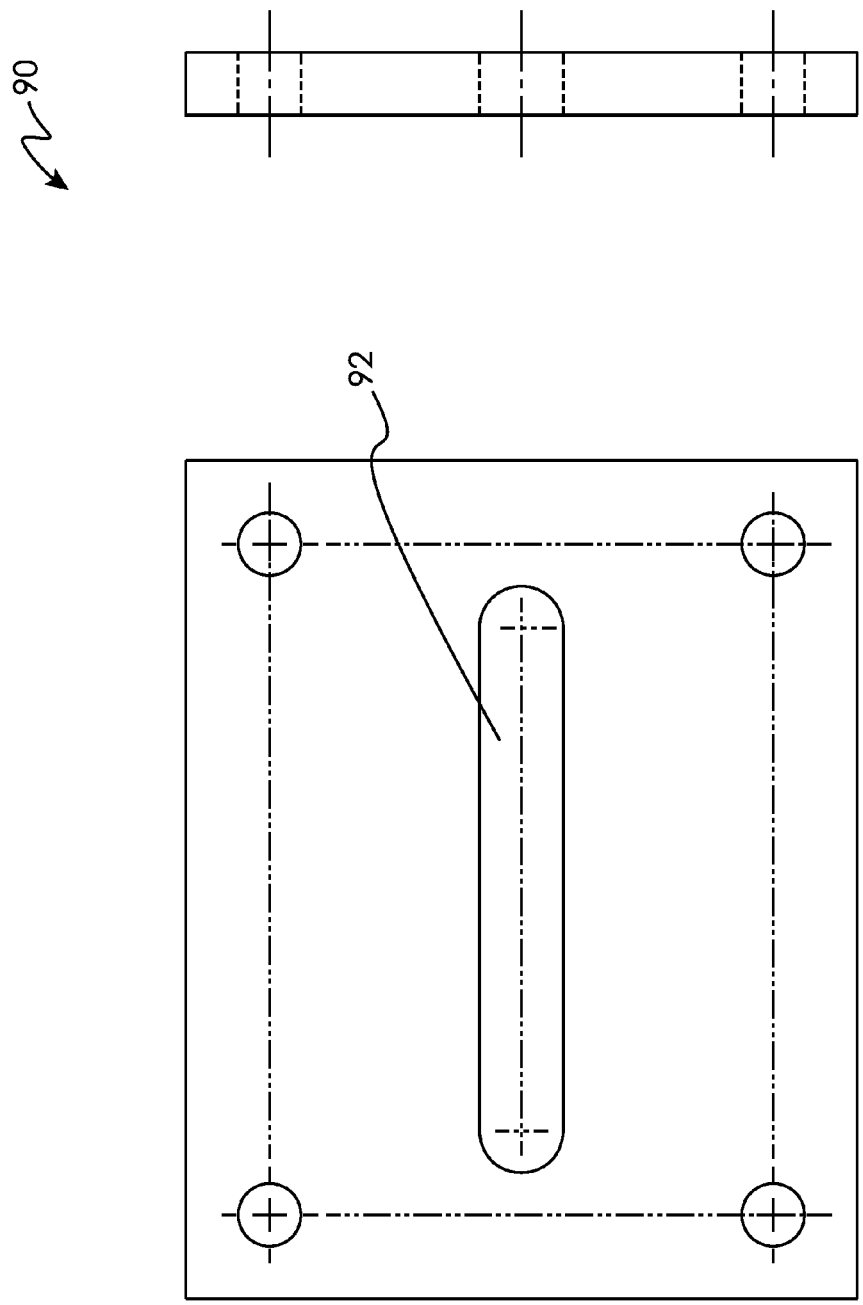
FIG. 15 is a plurality of views of a mounting plate for the top panel.

The top panel 52 may be attached to the doors via a mounting bracket 88 (shown in FIG. 14) and a mounting plate 90 (shown in FIG. 15). The mounting plate 90 may be coupled by any desired means such as bolting, welding, etc. to the rear door of the trailer and the bracket 88 may be bolted, welded, or the like to the top panel 52. An end of the mounting bracket 88 is received in a slot 92 formed in the mounting panel 90 and welded thereto to secure the top panel 52 to the door of the trailer.

The top and side panels 52, 54 of the wake convergence device 50 are planar materials that are mounted with the flared ends transitioning the leading edge from forward of the vehicle trailing edge to aft of the vehicle's trailing edge with an offset allowing a gap between the panels and the trailer. The general effect of the wake convergence device 50 is to fill the low pressure region behind the vehicle through converging the upstream airflow by reducing the effective channel area between the wake convergence device 50 and the trailer. This process speeds up the localized velocity in this region by means of a venturi effect and allows for optimum wake penetration. The wake convergence device trailing edge may be angled at 20° downward from a centerline of the trailer to improve a convergence of airflow over the wake convergence device 50. The trailing edge of the wake convergence device 50 is mounted aft of the trailer.

In some embodiments, the brackets and hinges may also be a planar material that is mounted perpendicular to the wake convergence device 50. The isolated effect of the brackets and hinges is to straighten the onset flow (Compare FIGS. 19A and 19B to FIGS. 20A and 20B). The straightening of this onset flow reduces the flow mixing and weakens the strength of the turbulent shedding off this vehicle.

The combined effect of the wake convergence device 50 and the brackets and hinges is to reduce the corner vortex shedding strength at all four corners of the vehicle's trailing edge. Another overall effect is a reduction in spray behind the vehicle when operating in wet conditions. Test results show a third combined benefit is the reduction in overall buffeting of the trailer. Finally, the combination of these parts also reduces mechanical drag due to a slight increase in aerodynamic lift. Adding aerodynamic lift will remove some drag forces because the tire contact patch will not be as large on the road surfaces.

This combination device is mounted in such a fashion that the trailer doors can be opened to "full swing" (i.e. 225°) from a deployed position to a stowed position, thereby allowing for the easy loading and unloading of payload. In particular, the side panels swing outward on the hinges toward the front of the trailer and rest along the sides of the trailer to allow the doors to open "full swing". Additionally, it is typical and common for trucks to back into loading docks and hit the top of their trailers against the padded top edge of the loading dock opening. Therefore, the top panel 52 is mounted to the side doors so that the top panel halves 78 swing outward with the doors and position above the trailer along a side of the trailer when the doors are opened. Moreover, the top panel 52 may be designed in such a manner as to not block the rain gutters.

A proto-type of the wake convergence device 50 was manufactured and installed on a full scale trailer. This trailer was then road tested using a separate fuel tank to increase the accuracy of the fuel usage measurement. The on road tests showed a measured improvement matching the nominal 2% improvement found during the wind tunnel tests.

A few areas of adjustment are noted in this wake convergence device 50. Firstly, the height of the top panel 52 may be adjustable to meet trailer height regulations by utilizing different size brackets or mounting the brackets at different heights on the door. Additionally, the adjustability in the top panel mounting brackets may allow for an additional 6 inches of trailer door swing so the doors can be as close to the trailer's existing sides as possible. Second, a "break-away" feature in the mounting for the top panel 52 may be added to allow for the reduction of damage in case of collision with foreign objects such as bridges, tree branches etc. The break-away feature may include a frangible portion within the brackets 88. When the top panel 52 is subjected to force, the frangible portion breaks so that the top panel 52 breaks away from the trailer.

Figure 17:
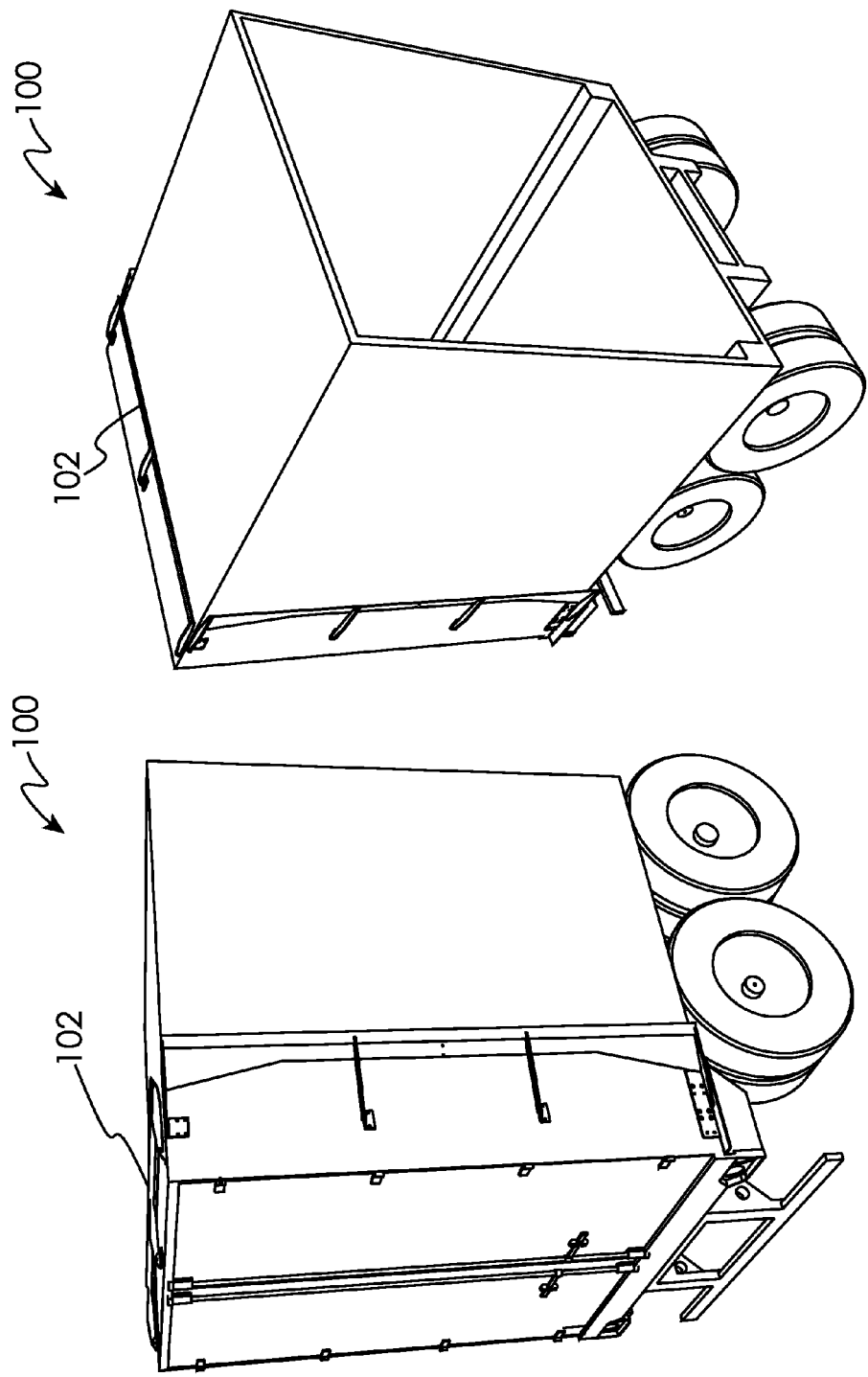
FIG. 17A is a rear perspective view of the wake convergence device shown in FIGS. 16A and 16B and in an open position.
FIG. 17B is a front perspective view of the wake convergence device shown in FIG. 17A and in an open position.
Figure 18:
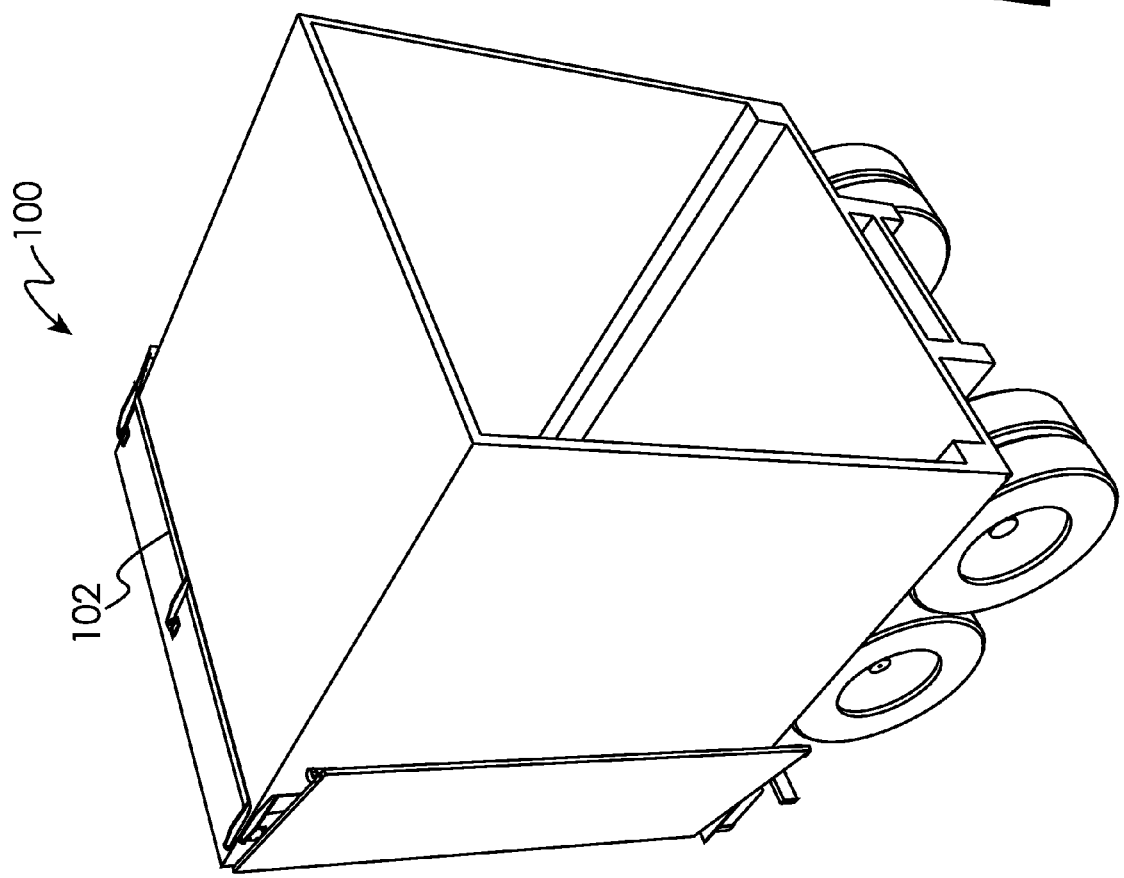
FIG. 18 is a front perspective view of the wake convergence device shown in FIGS. 17A and 17B and in an open position with the doors of a trailer opened.
Figure 20A:
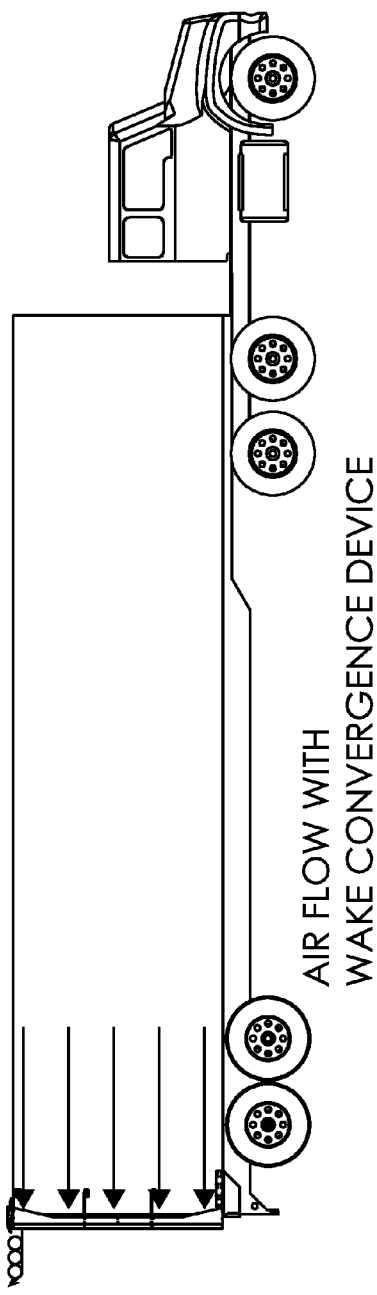
FIG. 20A is a side view of the airflow along the side of a trailer having a wake convergence device in accordance with the present invention.
Figure 20B:
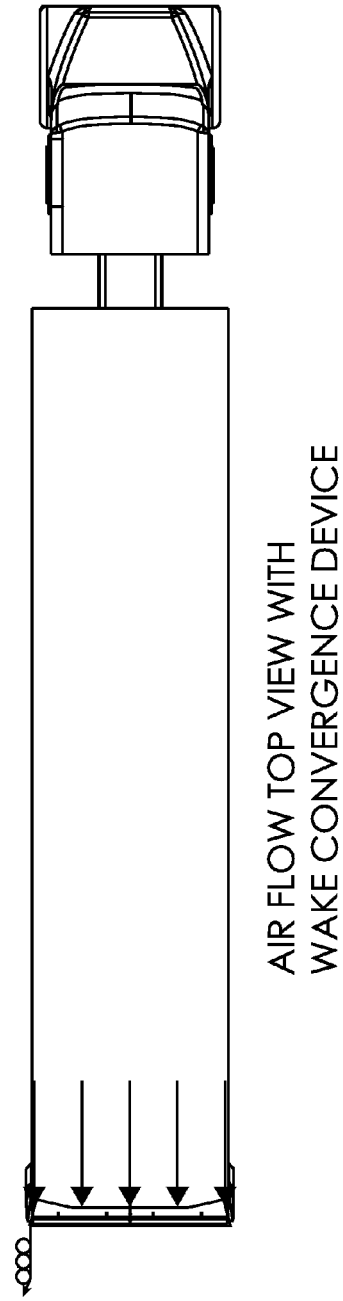
FIG. 20B is a top view of the airflow along the top of a trailer having a wake convergence device in accordance with the present invention.

Another embodiment of the wake convergence device 100 is illustrated in FIGS. 16-18. In this alternative embodiment, the top panel 102 of the wake convergence device 100 is hingedly attached to a top of the trailer. Accordingly, as illustrated in FIGS. 17-18, the top panel 102 may be rotated back toward the front of the trailer to allow the aft end of the trailer to be positioned in a loading dock.

Figure 21:
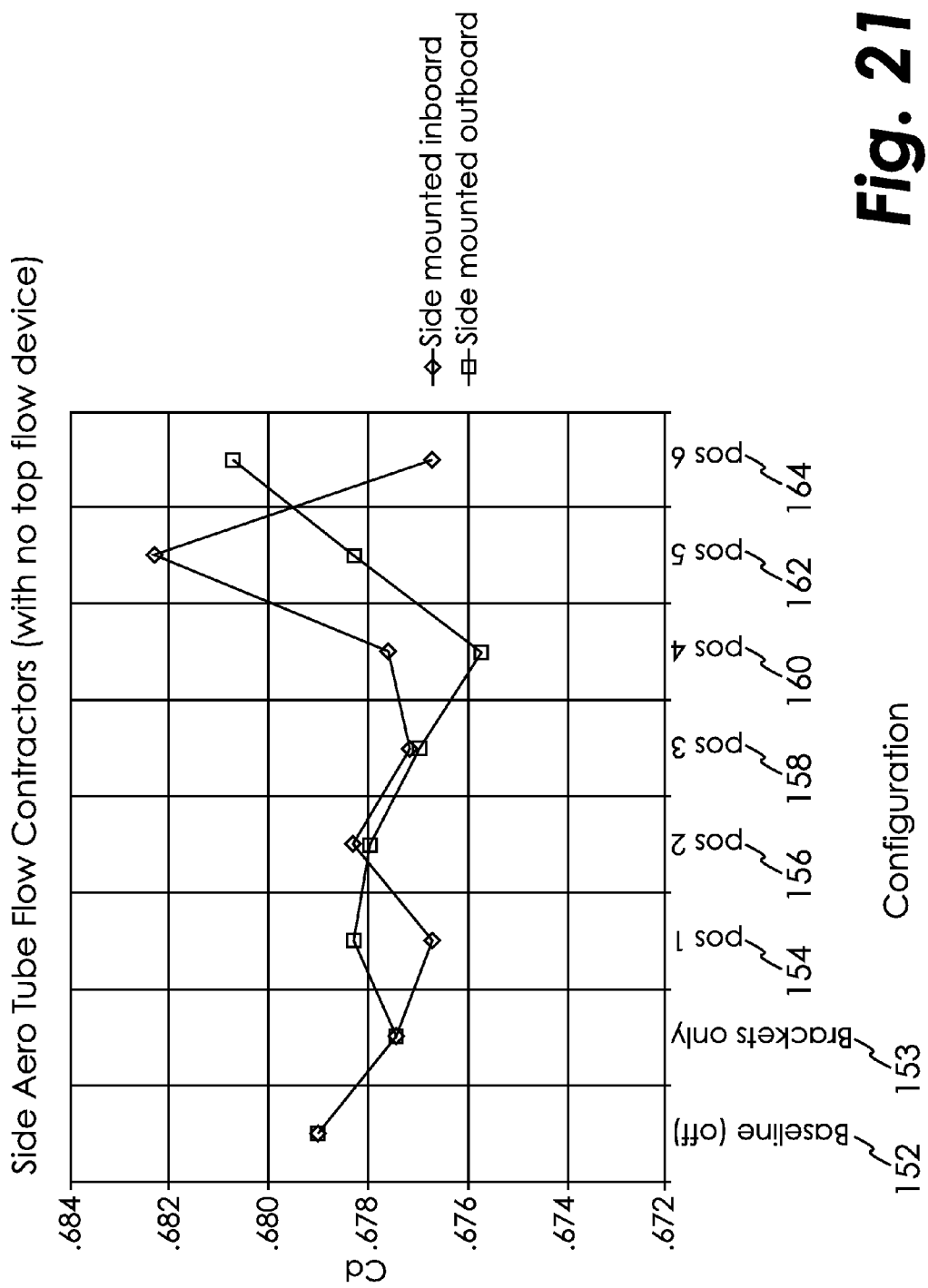
FIG. 21 is a graph of the coefficient of drag of a side aero tube flow panel with no top flow device.
Figure 22:
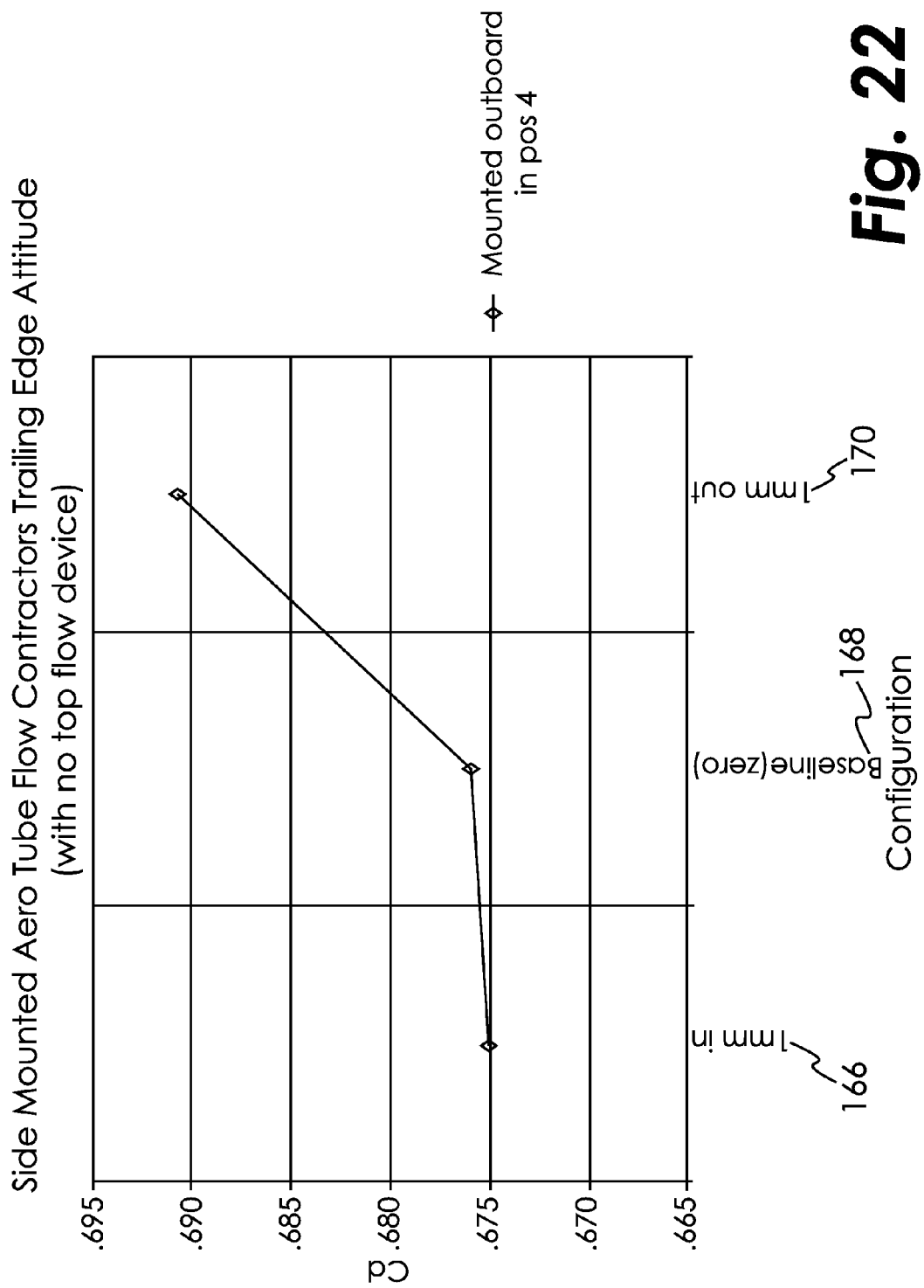
FIG. 22 is a graph of the coefficient of drag of a side mounted aero tube flow panel trailing edge attitude with no top flow device.
Figure 23:
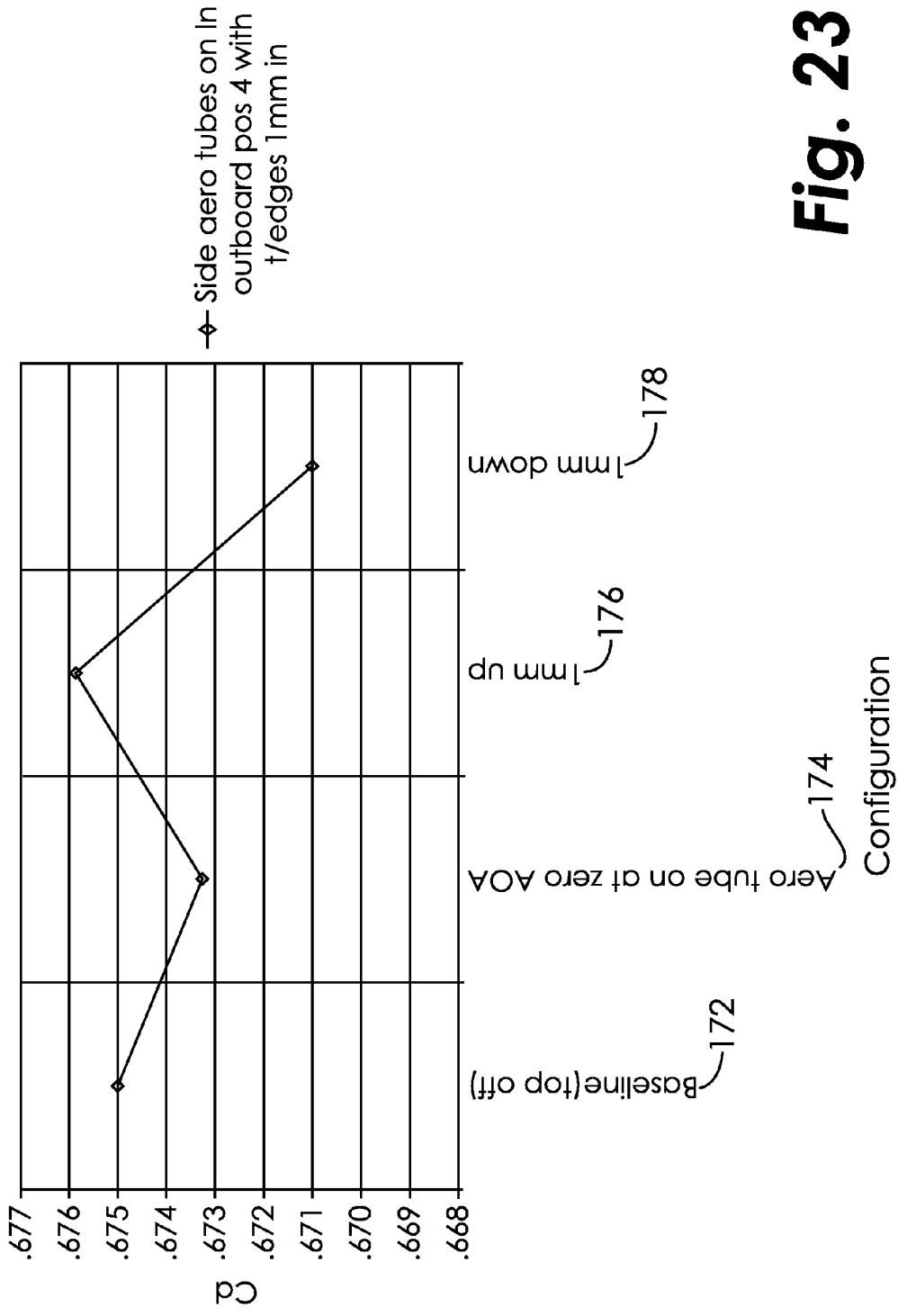
FIG. 23 is a graph of the coefficient of drag of a side aero tube flow panel with side aero tube flow devices.

FIGS. 21-23 illustrate graphs of the coefficient of drag when using prior art side aero tube flow panel (with no aerodynamic device on the top of the trailer), as opposed to the planar panels used in the present embodiments. FIG. 21 shows the coefficient of drag for side mounted inboard and outboard panels at various positions. Inboard and outboard panels specify the difference between the maximum allowable distance off the trailer's surface (outboard) and a step halfway between the outboard position and the trailer's surface (inboard). The first data point 152 is a baseline with no panel and the second data point 153 corresponds to only the brackets being attached to the trailer. At position 1 (data point 154), the panel is positioned 40 mm from the trailer; at position 2 (data point 156), the panel is positioned 80 mm from the trailer; at position 3 (data point 158), the panel is positioned 120 mm from the trailer; at position 4 (data point 160), the panel is positioned 160 mm from the trailer; at position 5 (data point 162), the panel is positioned 200 mm from the trailer; and at position 6 (data point 164), the panel is positioned 240 mm from the trailer. It is important to note that when discussing the graphs (FIGS. 21-35), positions 1 through 6 are universal and represent the same distances. FIG. 21 illustrates that a prior art side mounted outboard aero tube panel located at position 4 (data point 160) (160 mm) has the lowest coefficient of drag.

FIG. 22 illustrates the coefficient of drag for various trailing edge attitudes of a prior art side mounted outboard aero tube panel in position 4, wherein the trailing edge attitude is an angle of the trialing edge relative to a free stream flow. In particular, the attitudes include 1 mm in (data point 166), baseline (data point 168), and 1 mm out (data point 170). The side mounted outboard aero tube panel has the lowest coefficient of drag with an attitude of 1 mm in, while in position 4.

FIG. 23 illustrates the coefficient of drag for various angles of attack ("AOA") for a prior art top mounted aero tube flow panel added to the trailer, wherein the angle of attack is an angle of the wake convergence device relative to a free stream flow. The coefficient of drag is illustrated while maintaining the side mounted prior art outboard aero tube panel having a trailing edge attitude of 1 mm in at position 4. In particular, the AOA's include baseline (top panel off) (data point 172), zero AOA (data point 174), 1 mm up (data point 176), and 1 mm down (data point 178). The aero tube has the lowest coefficient of drag with a top mounted aero tube flow panel having an AOA of 1 mm down when used with a side mounted outboard aero tube panel with a trialing edge attitude of 1 mm at position 4. It can be seen that the top mounted and side mounted prior art aero tube flow panels provide a total reduction in the coefficient of drag from 0.679 to 0.6755.

Figure 24:
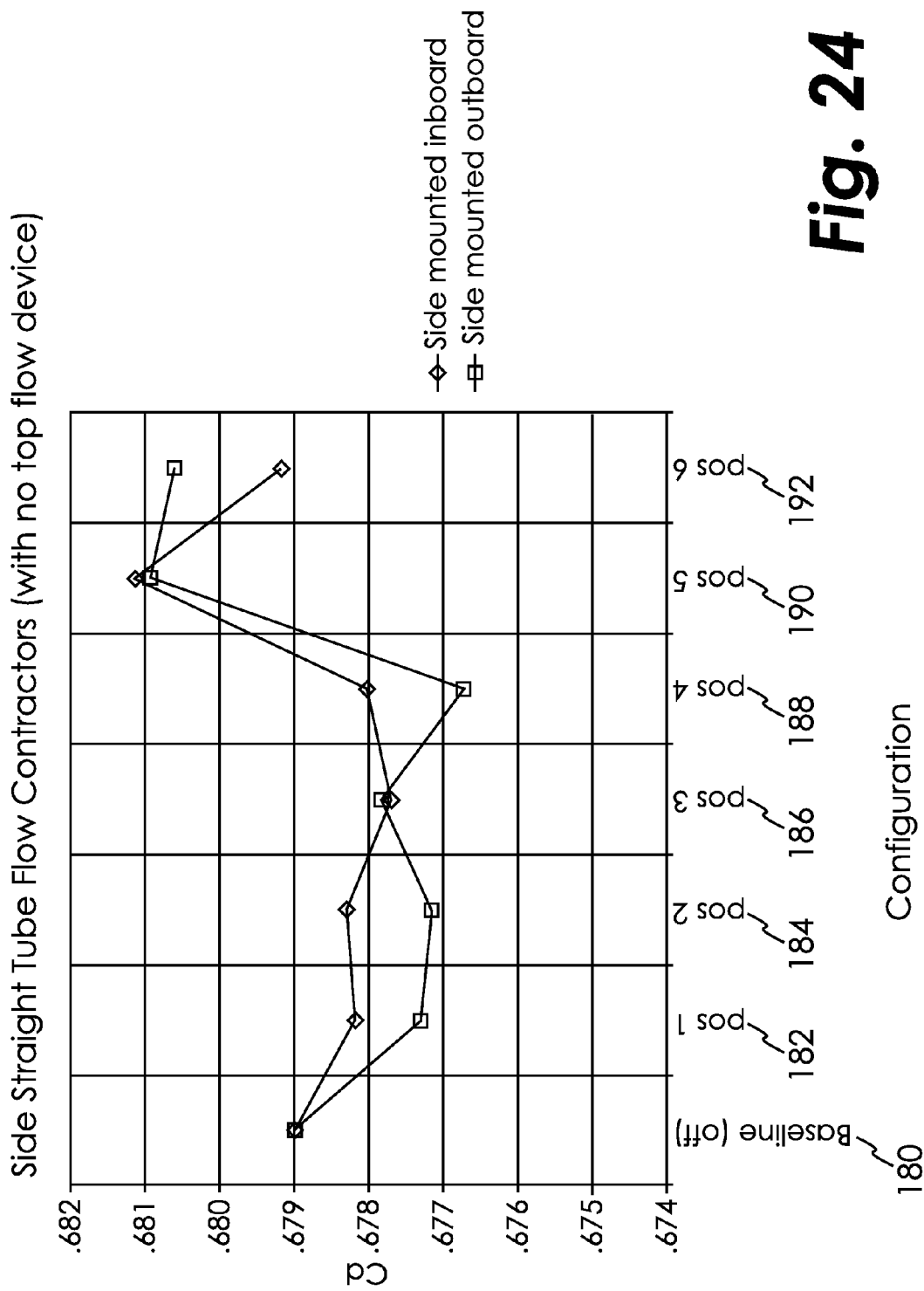
FIG. 24 is a graph of the coefficient of drag of a side straight flow panel with no top flow device.
Figure 25:
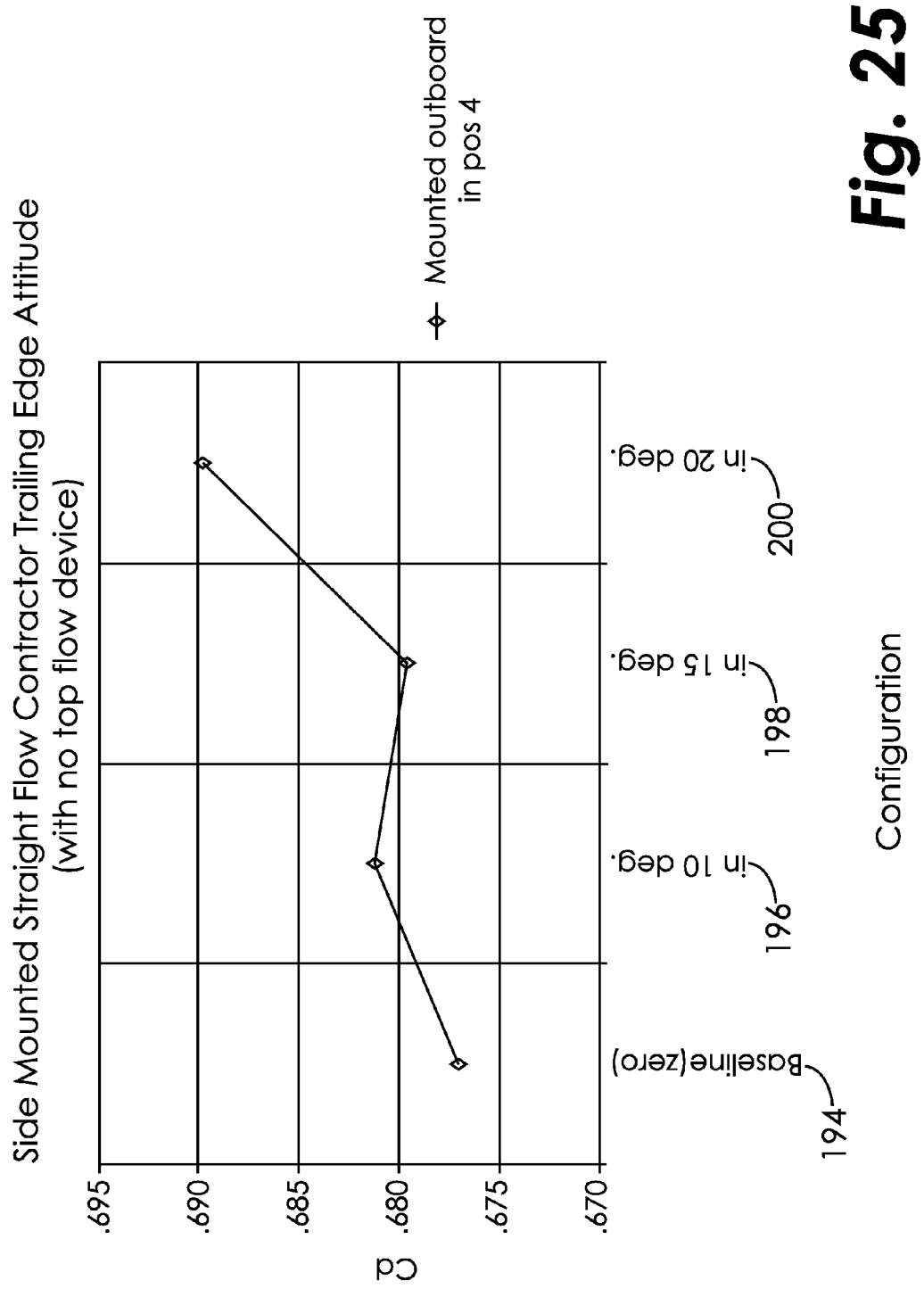
FIG. 25 is a graph of the coefficient of drag of a side mounted straight flow panel trailing edge attitude with no top flow device.
Figure 26:
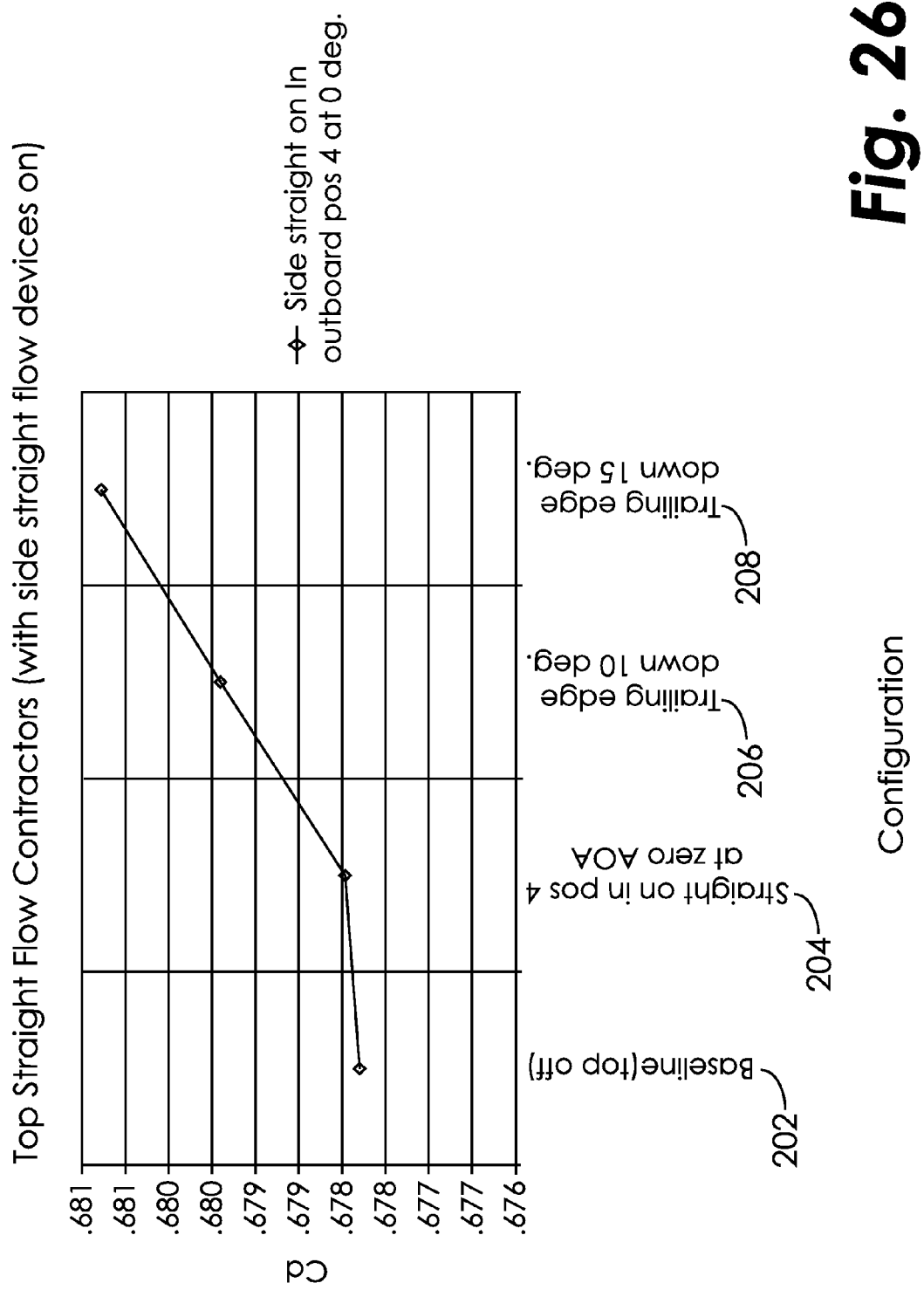
FIG. 26 is a graph of the coefficient of drag of a top straight flow panel with side straight flow devices.

FIGS. 24-26 are graphs of the coefficient of drag of a planar side panel wake convergence device with no top panel in accordance with an embodiment. FIG. 24 illustrates the coefficient of drag at various positions (baseline (data point 180), position 1 (data point 182), position 2 (data point 184), position 3 (data point 186), position 4 (data point 188), position 5 (data point 190), and position 6 (data point 192)) in accordance with an embodiment. As illustrated in FIG. 24, the lowest coefficient of drag (0.6765) is provided at position 4 mounted outboard. FIG. 25 illustrates the coefficient of drag at position 4 with various trailing edge attitudes (baseline (data point 194), 10° in (data point 196), 15° in (data point 198), and 20° in (data point 200)). As illustrated in FIG. 25, the lowest coefficient of drag (0.6755) is provided at baseline. In other words, angling the trailing edge inboard only worsened the coefficient of drag for this configuration. FIG. 26 illustrates the coefficient of drag with a planar side panel in accordance with an embodiment at position 4 and a trailing edge attitude at baseline, adding a top panel in accordance with an embodiment and various top panel AOA's (baseline (data point 202), 0° (data point 204), 10° down (data point 206), and 15° down (data point 208)). As illustrated in FIG. 26, the lowest coefficient of drag (0.6785) is provided at baseline. In other words, adding the top panel only worsened the coefficient of drag for this configuration.

Figure 27:
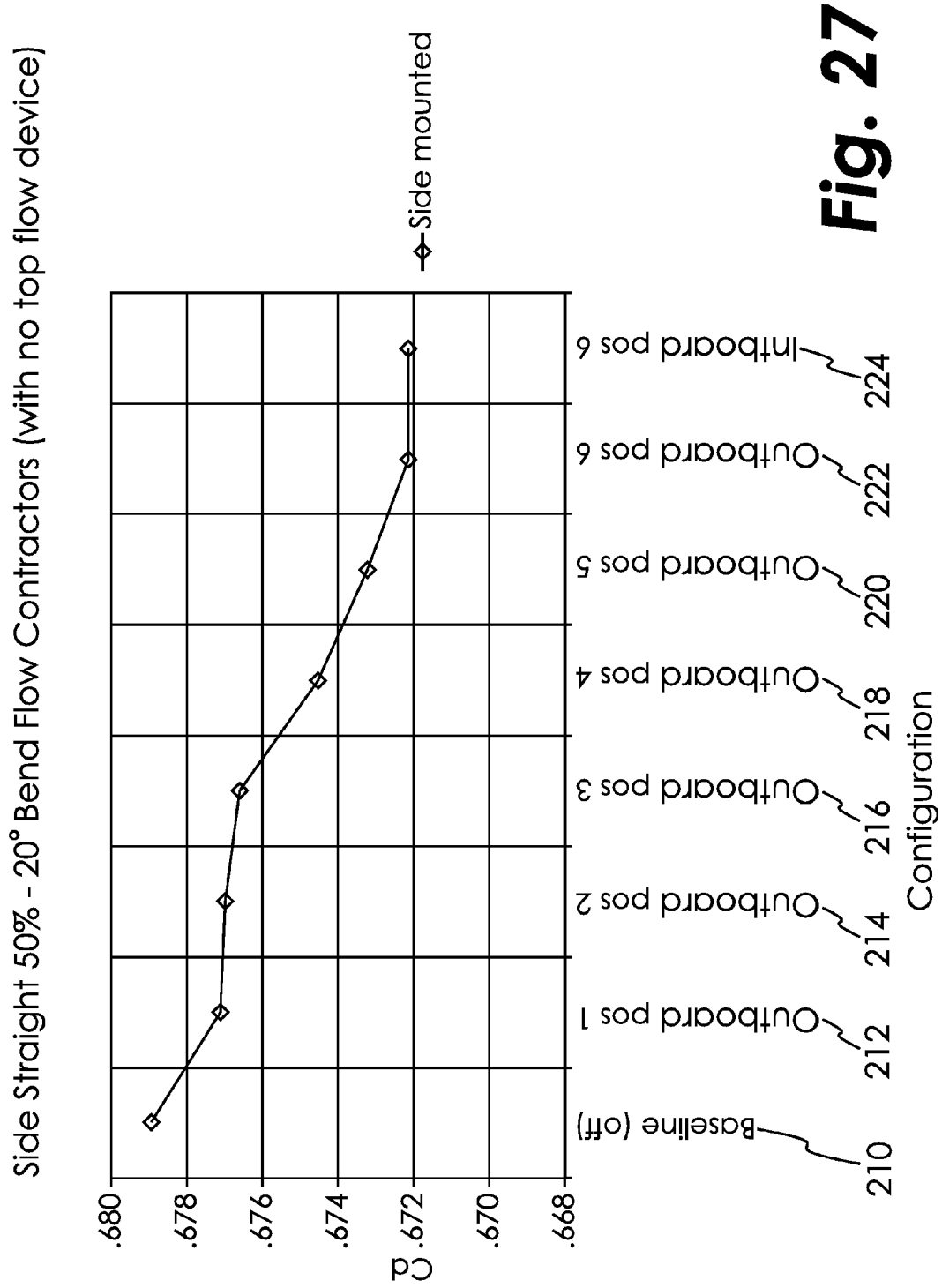
FIG. 27 is a graph of the coefficient of drag of a side straight 50%-20° bend flow panel with no top flow device.
Figure 28:
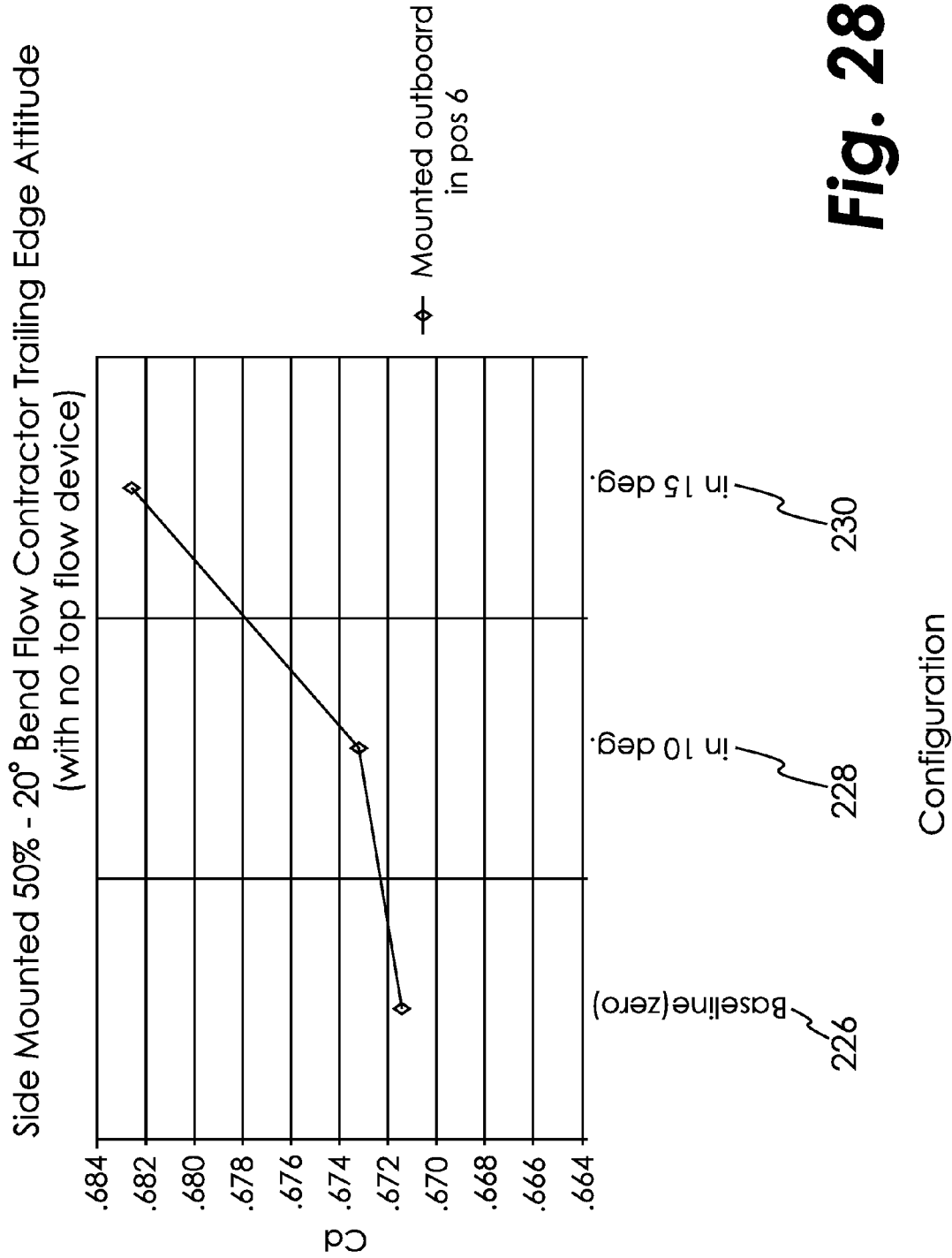
FIG. 28 is a graph of the coefficient of drag of side mounted 50%-20° bend flow panel trailing edge attitude with no top flow device.

FIGS. 27-28 are graphs of the coefficient of drag of a planar side panel with no top panel according to an embodiment, having 50% straight (i.e, half of the side panel leading edge straight) and a 20° trailing edge bend in accordance with an embodiment. It should be noted that the 20° trailing edge bend corresponds to the 160° trailing edge bend discussed above since in this particular example the angle is being measured from an opposite end of the trailing edge. FIG. 27 illustrates the coefficient of drag at various positions (baseline (data point 210), outboard position 1 (data point 212), outboard position 2 (data point 214), outboard position 3 (data point 216), outboard position 4 (data point 218), outboard position 5 (data point 220), outboard position 6 (data point 222), and inboard position 6 (data point 224)) in accordance with an embodiment. As illustrated in FIG. 27, the lowest coefficient of drag (0.672) is provided at outboard position 6. FIG. 28 illustrates the coefficient of drag of the side panel used in FIG. 27 at outboard position 6 with various trailing edge attitudes (baseline (data point 226), 10° in (data point 228), and 15° in (data point 230)). As illustrated in FIG. 28, the lowest coefficient of drag (0.6785) is provided at baseline. In other words, changing the attitude only worsened the coefficient of drag for this configuration.

Figure 29:
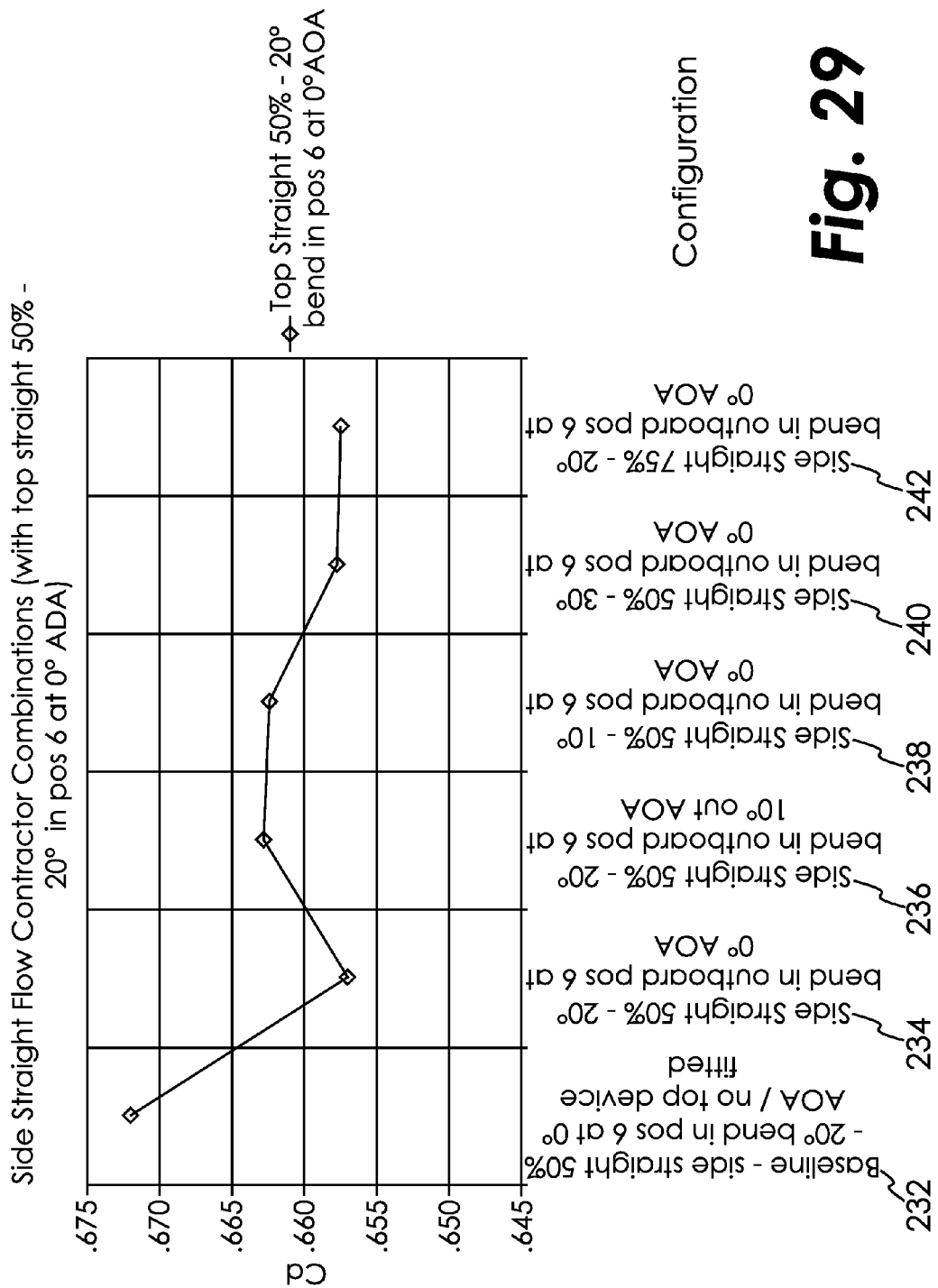
FIG. 29 is a graph of the coefficient of drag of side straight flow panels with top straight flow 50%-20° in position 6 at 0° angle of attack.

FIG. 29 illustrates the coefficient of drag of planar side panel combinations with a top panel added and being 50% straight, having a 20° trailing edge bend, in position 6, and having a 0° AOA. The combinations tested included baseline side straight 50% with a 20° trailing edge bend in outboard position 6 at 0° AOA with no top device fitted (data point 232), side straight 50% with a 20° trailing edge bend in outboard position 6 at 0° AOA (data point 234), side straight 50% with a 20° trailing edge bend in outboard position 6 at 10° out AOA (data point 236), side straight 50% with a 10° trailing edge bend in outboard position 6 at 0° AOA (data point 238), side straight 50% with a 30° trailing edge bend in outboard position 6 at 0° AOA (data point 240), and side straight 75% with a 20° trailing edge bend in outboard position 6 at 0° AOA (data point 242). The lowest coefficient of drag achieved (0.675) occurred when using either side straight 50% with a 20° trailing edge bend in outboard position 6 at 0° AOA or side straight 75% with a 20° trailing edge bend in outboard position 6 at 0° AOA.

Figure 30:
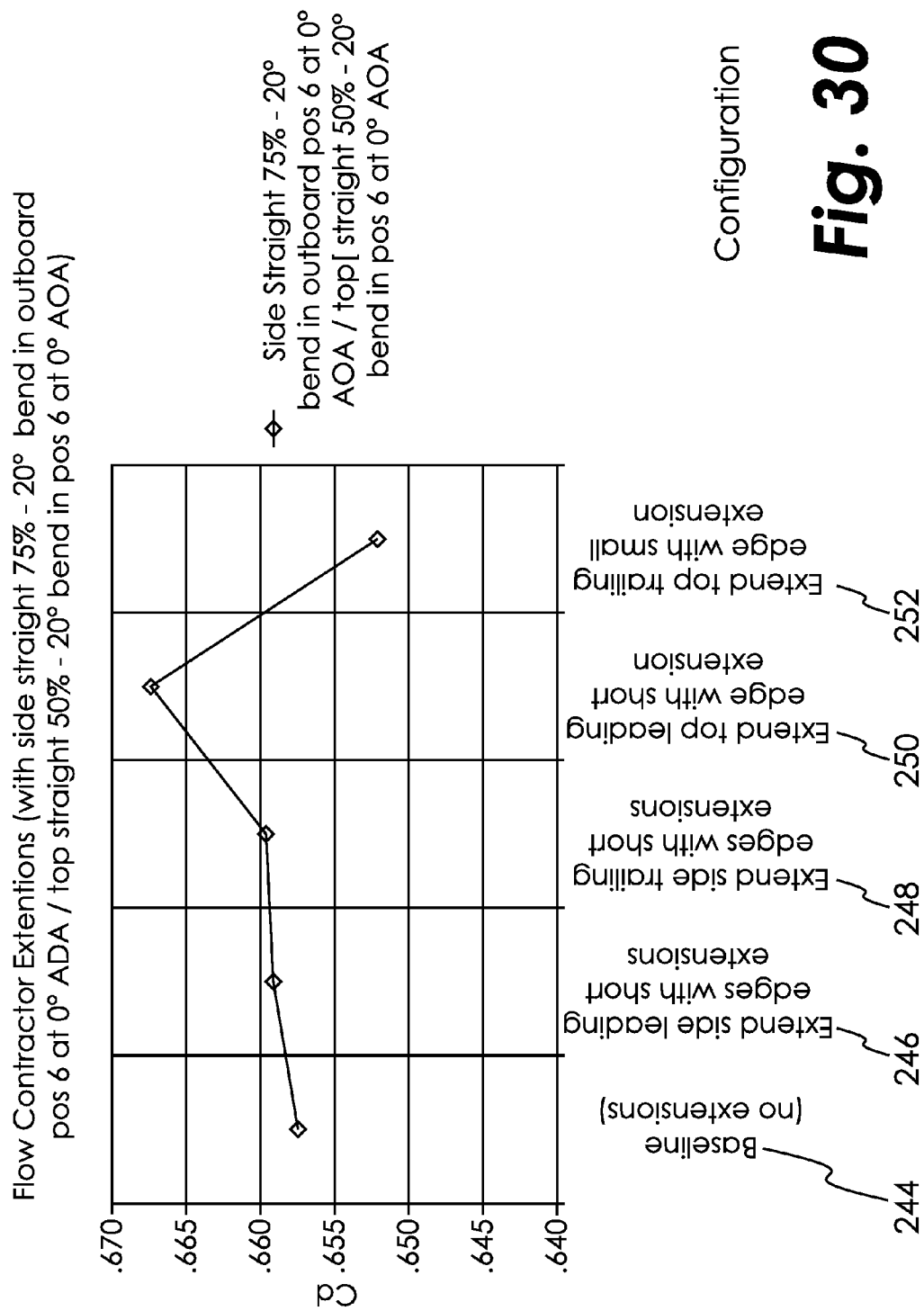
FIG. 30 is a graph of the coefficient of drag of flow panel extensions with side straight 75%-20° bend in outboard position 6 at 0° angle of attack and top straight 50%-20° bend in position 6 at 0° angle of attack.

FIG. 30 illustrates the coefficient of drag resulting from various extensions added to a wake convergence device including a side panel straight at 75%, a 20° trialing edge bend in outboard position 6 and with a 0° AOA with a top panel straight at 50% with a 20° trailing edge bend in position 6 and a 0° AOA. The different extension combinations included baseline (data point 244), extending the side leading edges with short extensions (data point 246), extending the side trialing edges with short extensions (data point 248), extending the top leading edge with a short extension (data point 250), and extending the top trailing edge with a small extension (data point 252). As can be seen in FIG. 30, extending the top trailing edge with a small extension provided to lowest coefficient of drag (0.651).

Figure 31:
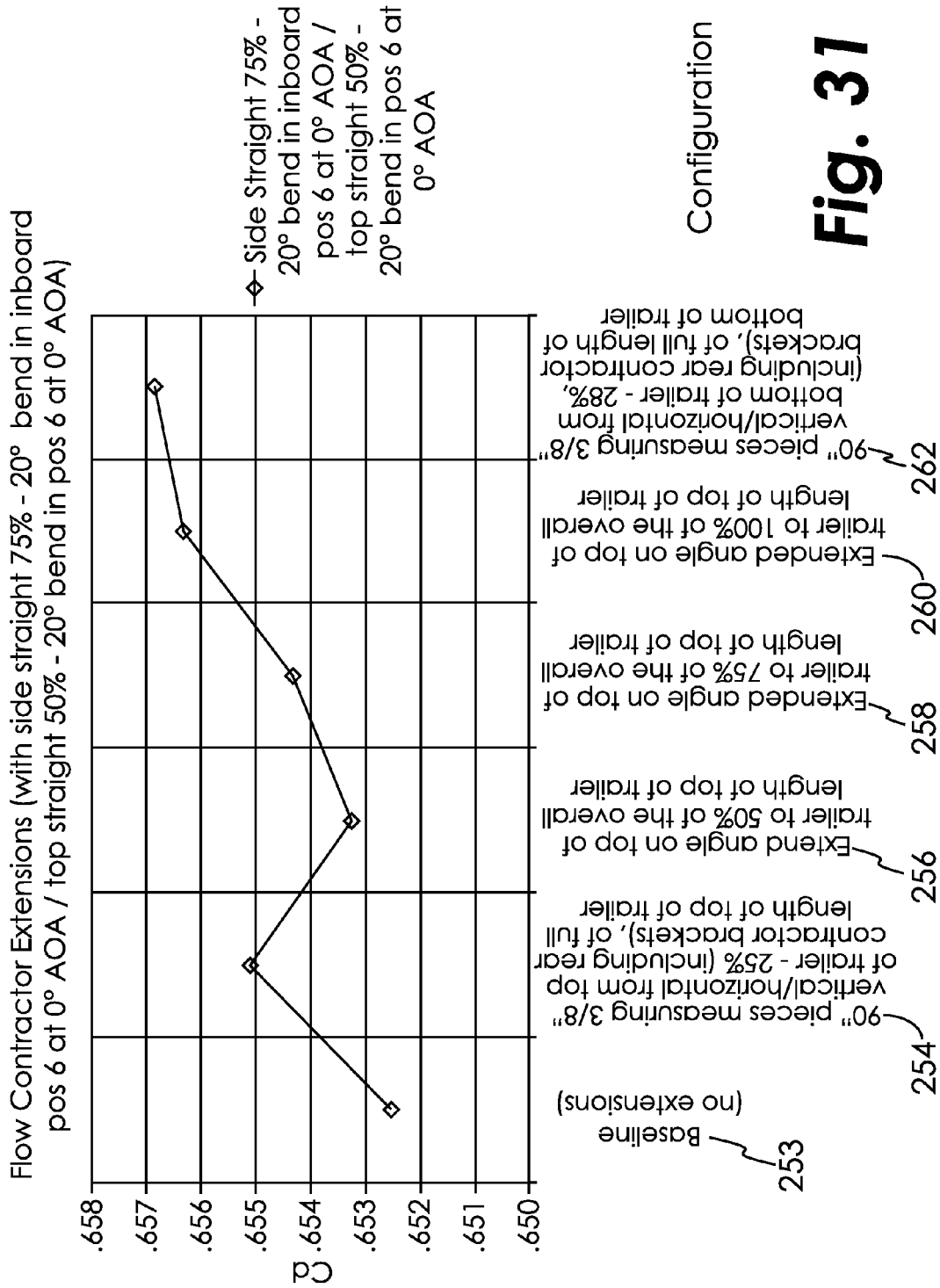
FIG. 31 is a graph of the coefficient of drag of flow panel extensions with side straight 75%-20° bend in inboard position 6 at 0° angle of attack and top straight 50%-20° bend in position 6 at 0° angle of attack.

FIG. 31 illustrates the coefficient of drag of resulting from various extensions added to a wake convergence device in accordance with an embodiment and including a side panel straight at 75% with a 20° trailing edge bend in inboard position 6 and a 0° AOA combined with a top panel straight at 50% with a 20° trailing edge bend in position 6 and a 0° AOA. The different configurations included baseline (no extensions) (data point 253) angled 90 degree leading edge and trialing edge sections, wherein the leading edge section measures 3 inches and the pieces are angled vertical/horizontal from the top of the trailer and extend 25% of the full length of the top of the trailer (data point 254); as above but extending to 50% of the overall length of the top of the trailer (data point 256); as above but extending to 75% of the overall length of the top of the trailer (data point 258); as above but extending 100% of the overall length of the top of the trailer (data point 260); and 90 degree leading edge and trialing edge sections, wherein the leading edge section measures 3 inches and the pieces are angled vertical/horizontal from the bottom of the trailer and extend 28% (including rear panel brackets) of the full length of the bottom of the trailer (data point 262). All of these modifications resulted in a worsening of the baseline coefficient of drag.

Figure 32:
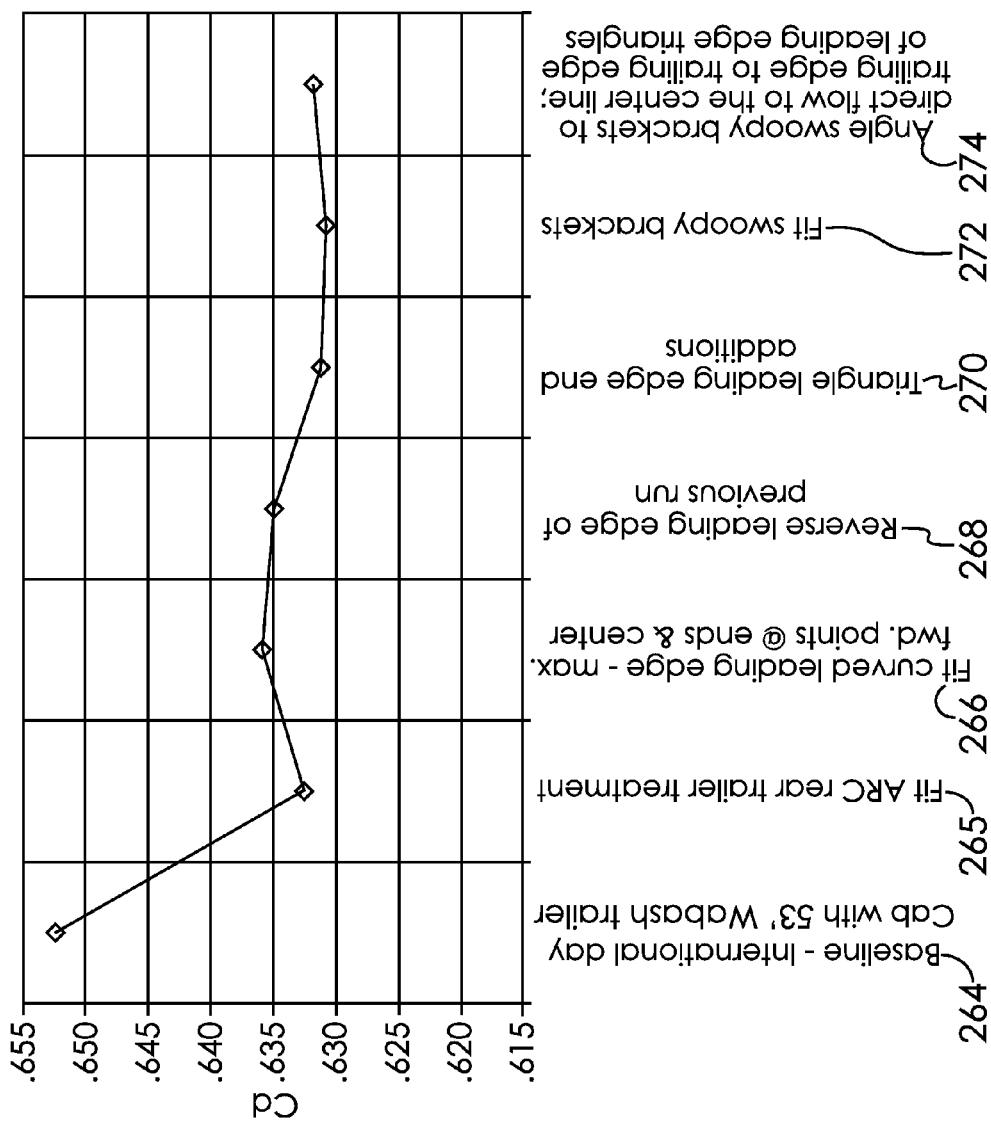
FIG. 32 is a graph of the coefficient of drag of the final modifications for a 53 foot WABASH® trailer.

FIG. 32 illustrates modifications made to a 53 foot WABASH® trailer. At baseline the coefficient of drag for the trailer is 0.6525. With a baseline wake convergence device according to an embodiment (data point 264), the coefficient of drag is 0.6525. With a rear trailer treatment (data point 265), the coefficient of drag is 0.6325. When adding a curved leading edge (maximum forward points at the ends) to both the side and top panels (data point 266), the coefficient of drag is 0.6355. When reversing the leading edge of the above configuration (maximum forward point at the center) (data point 268), the coefficient of drag is 0.635. When adding triangular leading edge additions (as shown in FIG. 5) to the baseline (data point 270), the coefficient of drag is 0.631. When adding aerodynamically shaped brackets (data point 272), the coefficient of drag is 0.631. When adding angled aerodynamically shaped brackets (data point 274), the coefficient of drag is 0.632. Accordingly, the wake convergence device lowered the coefficient of drag of the stock 53 foot WABASH® trailer from 0.6525 to 0.632.

Figure 33:
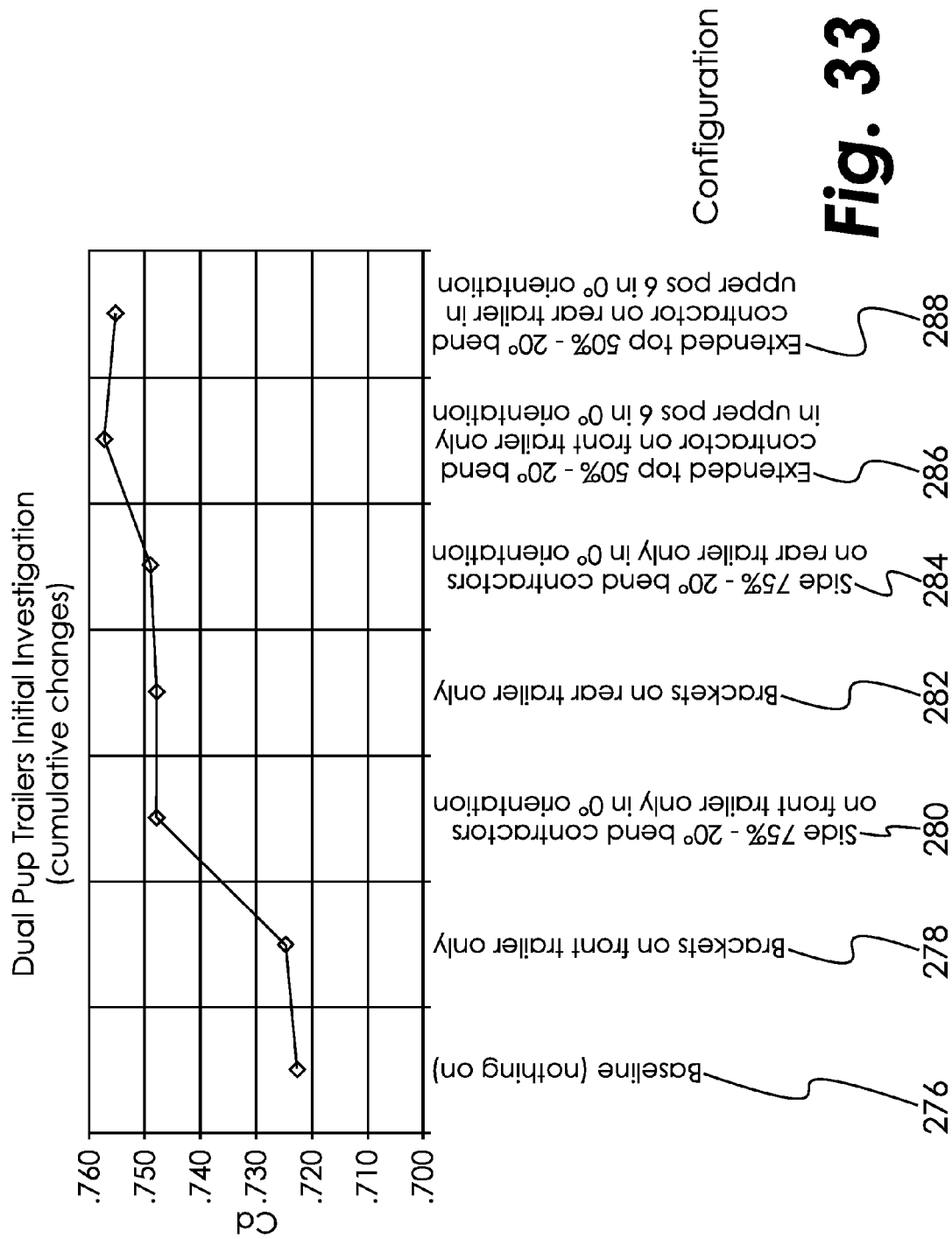
FIG. 33 is a graph of the coefficient of drag of a dual pup trailer.

FIG. 33 illustrates the coefficient of drag for an initial dual 28 foot pup trailer (two trailers pulled behind one semi tractor) investigation. At baseline (data point 276), the coefficient of drag is 0.721. The following modifications represent cumulative changes. With brackets only (and only on the front trailer) (data point 278), the coefficient of drag is 0.725. When adding side panels 75% straight with 20° trailing edge bend on the front trailer only (data point 280), the coefficient of drag is 0.748. When adding brackets only on the rear trailer (data point 282), the coefficient of drag is 0.749. When adding side panels 75% straight with 20° trailing edge bend on the rear trailer only (data point 284), the coefficient of drag is 0.75. With an extended top panel 50% straight with a 20° trailing edge bend on the front trailer in position 6 (data point 286), the coefficient of drag is 0.758. With an extended top panel 50% straight with a 20° trailing edge bend on the rear trailer only (data point 288), the coefficient of drag is 0.756.

Figure 34:
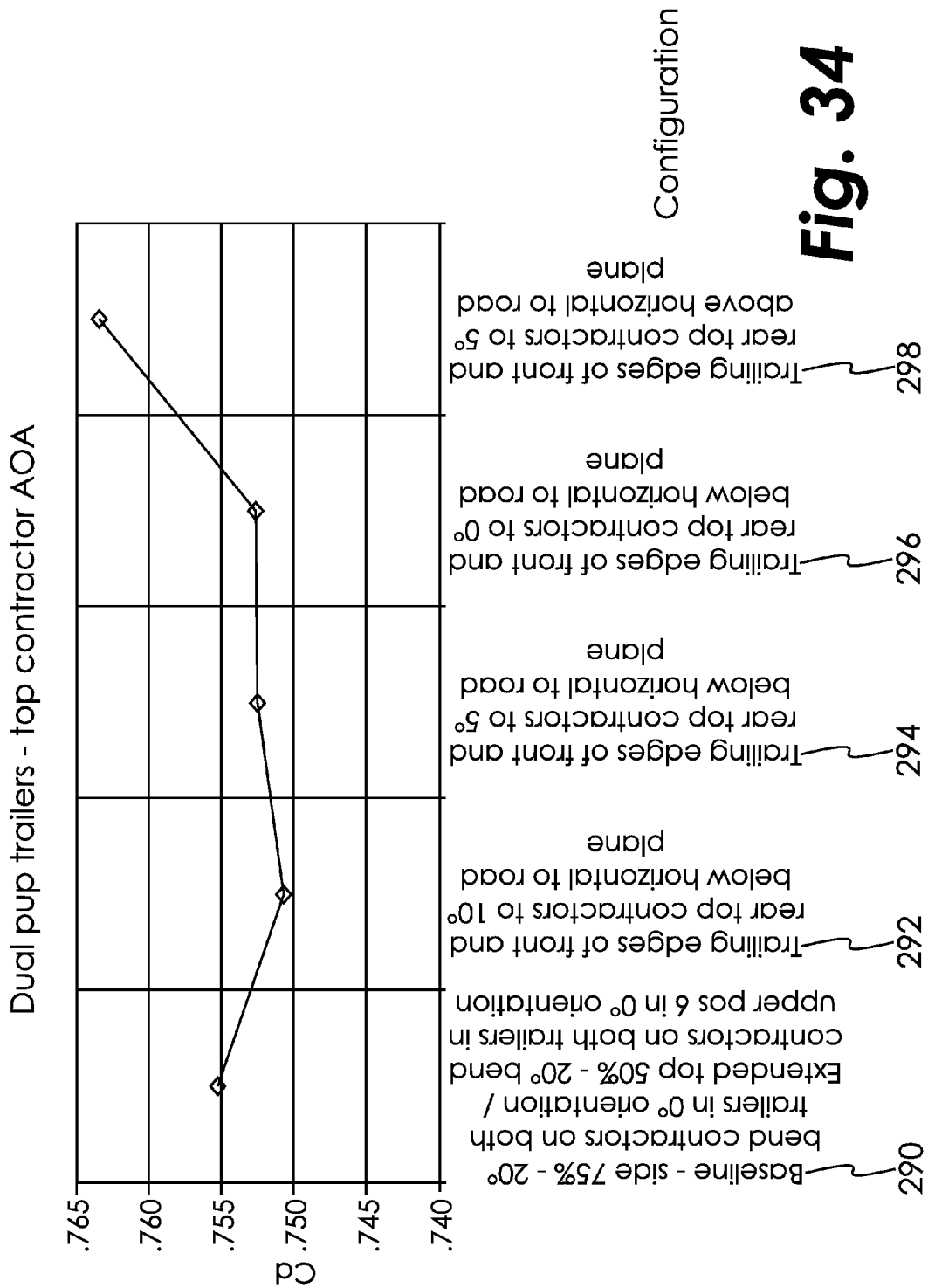
FIG. 34 is a graph of the coefficient of drag of a dual pup trailer with varying top panel angles of attack.

FIG. 34 illustrates the coefficient of drag for a dual pup trailer when adjusting the AOA. With a baseline including side panels 75% straight with a 20° trailing edge bend on both trailers in 0° orientation and an extended top panel 50% straight with a 20° trailing edge bend on both trailers in position 6 with a 0° orientation (data point 290), the coefficient of drag is 0.755. With the trialing edges of the front and rear top panels at 10° below horizontal to the road plane (data point 292), the coefficient of drag is 0.751. With the trialing edges of the front and rear top panels at 5° below horizontal to the road plane (data point 294), the coefficient of drag is 0.7525. With the trialing edges of the front and rear top panels horizontal to the road plane (data point 296), the coefficient of drag is 0.7525. With the trialing edges of the front and rear top panels at 5° above horizontal to the road plane (data point 298), the coefficient of drag is 0.764.

Figure 35:
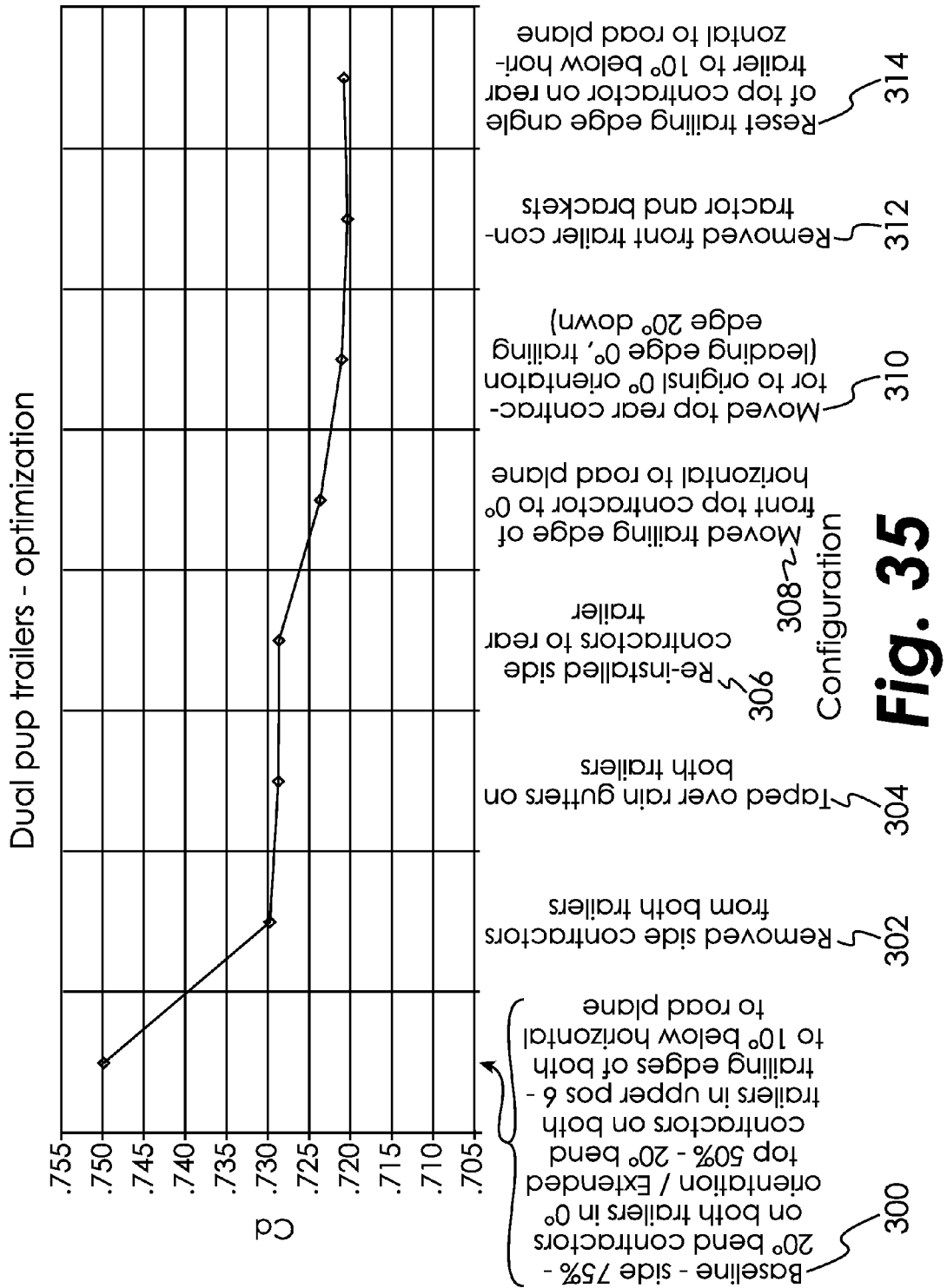
FIG. 35 is a graph of the coefficient of drag of a dual pup trailer optimization.

FIG. 35 illustrates the coefficient of drag for an optimized dual pup trailer using wake convergence devices according to an embodiment. Starting with a baseline including side panels straight 75% with a 20° trailing edge bend on both trailers in 0° orientation and an extended top panel 50% straight with a 20° trailing edge bend on both trailers in upper position 6 with the trailing edges of both 10° below the horizontal plane of the road (data point 300), the coefficient of drag is 0.75. When the side panels are removed from both trailers (data point 302), the coefficient of drag is 0.73. When rain gutters of both trailers are taped over (data point 304), the coefficient of drag is 0.729. When the side panels are re-installed (data point 306), the coefficient of drag is 0.728. When the trialing edge of the front top panel is moved to horizontal with the plane of the road (data point 308), the coefficient of drag is 0.724. When the top rear panel is moved to 0° orientation (leading edge at 0° and trailing edge at 20° down) (data point 310), the coefficient of drag is 0.721. When the front trailer side panels and brackets are removed (data point 312), the coefficient of drag is 0.72. When the trailing edge angle of the top panel on the rear trailer is moved to 10° below horizontal to the surface of the road (data point 314), the coefficient of drag is 0.72. The coefficient of drag was therefore reduced from 0.75 to 0.72 by using a wake convergence device according to an embodiment.

While this disclosure has been described using disclosed embodiments, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A wake convergence device for a vehicle having a vehicle top and first and second vehicle sides each extending from the vehicle top, the vehicle including a vehicle leading edge, a vehicle trailing edge, and a vehicle longitudinal axis, the wake convergence device comprising:
   a top panel positioned above and spaced from the vehicle top, the top panel including a top panel leading edge that transitions from forward of the vehicle trailing edge to aft of the vehicle trailing edge;
   a first side panel positioned beside and spaced from the first vehicle side and including a first side panel leading edge that transitions from forward of the vehicle trailing edge to aft of the vehicle trailing edge; and
   a second side panel positioned beside and spaced from the second vehicle side and including a first side panel leading edge that transitions from forward of the vehicle trailing edge to aft of the vehicle trailing edge.

2. The wake convergence device of claim 1, wherein the top panel includes a top panel axis extending collinearly with the top panel leading edge at a center of the top panel, the top panel further comprising:
   a first top panel end that extends forward of the top panel axis; and
   a second top panel end that extends forward of the top panel axis.

3. The wake convergence device of claim 1, wherein:
   the first side panel includes a first side panel axis extending collinearly with the first side panel leading edge at a center of the first side panel, the first side panel further comprising at least one first side panel end that extends forward from the first side panel axis; and
   the second side panel includes a second side panel axis extending collinearly with the second side panel leading edge at a center of the second side panel, the second side panel further comprising at least one second side panel end that extends forward from the second side panel axis.

4. The wake convergence device of claim 1, wherein:
   a portion of the top panel forward of the top panel trailing edge angles toward the vehicle longitudinal axis;

a portion of the first side panel forward of a first side panel trailing edge angles toward the vehicle longitudinal axis; and a portion of the second side panel forward of a second side panel trailing edge angles toward the vehicle longitudinal axis.

5. The wake convergence device of claim 1, wherein each of said first and second side panels rotates approximately 225° from a deployed position to a stowed position.

6. The wake convergence device of claim 1, wherein the top panel includes two top panel halves, each top panel half joined to a vehicle door at an aft end of the vehicle.

7. The wake convergence device of claim 6, wherein each top panel half moves with the respective vehicle door and positions above the vehicle when the vehicle door is opened full swing.

8. The wake convergence device of claim 1, wherein the top panel is hingedly attached to the vehicle top and rotates toward the vehicle leading edge.

9. The wake convergence device of claim 1, wherein the top panel, the first side panel, and the second side panel are formed from planar materials.

10. The wake convergence device of claim 1, wherein the vehicle is a 53 foot semi-trailer.

11. A wake convergence device for a vehicle having a vehicle top and first and second vehicle sides each extending from the vehicle top, the vehicle including a vehicle leading edge, a vehicle trailing edge, and a vehicle longitudinal axis, the wake convergence device comprising:

a top panel positioned above and spaced from the vehicle top, the top panel including a top panel leading edge that transitions from forward of a vehicle trailing edge to aft of the vehicle trailing edge, the top panel including a top panel axis extending collinearly with the top panel leading edge at a center of the top panel, the top panel further comprising:
  a first top panel end that extends forward of the top panel axis;
  a second top panel end that extends forward of the top panel axis;
a first side panel positioned beside and spaced from the first vehicle side and including a first side panel leading edge that transitions from forward of the vehicle trailing edge to aft of the vehicle trailing edge, wherein the first side panel includes a first side panel axis extending collinearly with the first side panel leading edge at a center of the first side panel, the first side panel further comprising at least one first side panel end that extends forward from the first side panel axis; and
a second side panel positioned beside and spaced from the second vehicle side and including a second side panel leading edge that transitions from forward of the vehicle trailing edge to aft of the vehicle trailing edge, wherein the second side panel includes a second side panel axis extending collinearly with the second side panel leading edge at a center of the second side panel, the second side panel further comprising at least one second side panel end that extends forward from the second side panel axis.

12. The wake convergence device of claim 11, wherein:
the first side panel is hingedly attached to the first vehicle side so that the first side panel rotates toward the vehicle leading edge; and
the second side panel is hingedly attached to the second vehicle side so that the second side panel rotates toward the vehicle leading edge.

13. The wake convergence device of claim 12, wherein each of the first and second side panels rotates to approximately 225° from a deployed position to a stowed position.

14. The wake convergence device of claim 11, wherein:
a portion of the top panel forward of the top panel trailing edge angles toward the vehicle longitudinal axis;
a portion of the first side panel forward of a first side panel trailing edge angles toward the vehicle longitudinal axis; and
a portion of the second side panel forward of a second side panel trailing edge angles toward the vehicle longitudinal axis.

15. The wake convergence device of claim 11, wherein the top panel includes two top panel halves, each top panel half joined to a vehicle door at an aft end of the vehicle.

16. The wake convergence device of claim 15, wherein each top panel half moves with the respective vehicle door and positions above the vehicle when the vehicle door is opened full swing.

17. The wake convergence device of claim 11, wherein the top panel is hingedly attached to the vehicle top and rotates toward the vehicle leading edge.

18. The wake convergence device of claim 11, wherein the top panel, the first side panel, and the second side panel are formed from planar materials.

19. The wake convergence device of claim 11, wherein the vehicle is a 53 foot semi-trailer.

20. A method of directing streamline flow to a rear of a vehicle having a vehicle top and first and second vehicle sides each extending from the vehicle top, the vehicle including a vehicle leading, a vehicle trailing edge, and a vehicle longitudinal axis, the method comprising:

positioning a top panel above the vehicle top so that the top panel is spaced from the vehicle top, a top panel leading edge transitioning from forward of a vehicle trailing edge to aft of the vehicle trailing edge so that at least one top panel end extends forward from a top panel axis extending collinearly with the top panel leading edge at a center of the top panel;
positioning a first side panel along the first vehicle side, a first side panel leading edge transitioning from forward of a vehicle trailing edge to aft of the vehicle trailing edge so that at least one first side panel end extends forward from a first side panel axis extending collinearly with the first side panel leading edge at a center of the first side panel; and
positioning a second side panel along the second vehicle side, a second side panel leading edge transitioning from forward of a vehicle trailing edge to aft of the vehicle trailing edge so that at least one second side panel end extends forward from a second side panel axis extending collinearly with the second side panel leading edge at a center of the second side panel.

21. The method of claim 20 further comprising hingedly attaching each of the first side panel and the second side panel to the first vehicle side and the second vehicle side, respectively, so that the first side panel and the second side panel each rotate to approximately 225° from a deployed position to a stowed position.

22. The method of claim 20, wherein positioning a top panel above the vehicle top further comprises joining a pair of top panel halves to a pair of a vehicle doors at an aft end of the vehicle so that each top panel half moves with the respective vehicle door and positions above the vehicle when the vehicle doors are opened full swing.

23. The method of claim 20, wherein positioning a top panel above a top of the vehicle further comprises hingedly attaching the top panel to the vehicle top so that the top panel rotates toward the vehicle leading edge.

* * * * *